(12) United States Patent
Fukazawa et al.

(10) Patent No.: US 8,208,735 B2
(45) Date of Patent: Jun. 26, 2012

(54) IMAGE PROCESSING DEVICE, IMAGE PROCESSING METHOD, LEARNING DEVICE, LEARNING METHOD, AND PROGRAM

(75) Inventors: Kentaro Fukazawa, Kanagawa (JP); Takuo Morimura, Kanagawa (JP); Shinobu Yamada, Tokyo (JP); Hirosuke Nagano, Kanagawa (JP); Hideki Mori, Tokyo (JP); Yuya Aoki, Tokyo (JP); Yasuhiko Suga, Kanagawa (JP); Shunsuke Harasaki, Tokyo (JP); Seiichi Inomata, Tokyo (JP); Tetsujiro Kondo, Tokyo (JP)

(73) Assignee: Sony Corporation (JP)

( * ) Notice: Subject to any disclaimer, the term of this patent is extended or adjusted under 35 U.S.C. 154(b) by 664 days.

(21) Appl. No.: 12/381,271

(22) Filed: Mar. 10, 2009

(65) Prior Publication Data
US 2009/0232390 A1    Sep. 17, 2009

(30) Foreign Application Priority Data

Mar. 13, 2008 (JP) ................. P2008-064220

(51) Int. Cl.
*G06K 9/62* (2006.01)

(52) U.S. Cl. .................................................. 382/224
(58) Field of Classification Search .................. None
See application file for complete search history.

(56) References Cited

U.S. PATENT DOCUMENTS
5,517,588 A    5/1996    Kondo

FOREIGN PATENT DOCUMENTS
JP    05-328185 A    12/1993

*Primary Examiner* — Brian P Werner
*Assistant Examiner* — Elisa Rice
(74) *Attorney, Agent, or Firm* — Lerner, David, Littenberg, Krumholz & Mentlik, LLP

(57) ABSTRACT

An image processing device, to convert a first image data into a second image data having a higher image quality, includes: a predicted tap extracting unit to extract multiple pixels as a predicted tap for prediction computing; a level limit class tap extracting unit to extract multiple pixels as a level limit class tap for level limit classifying processing; a waveform class tap extracting unit to extract multiple pixels as a waveform class tap; a level limit classifying unit to classify the pixel of interest, based on a ratio between a level width and a dynamic range of the pixels making up the level limit class tap; a waveform pattern classifying unit to classify the pixel of interest; a prediction coefficient output unit to output a prediction coefficient corresponding to a combination of a level limit class and a waveform pattern class; and a prediction computing unit.

13 Claims, 20 Drawing Sheets

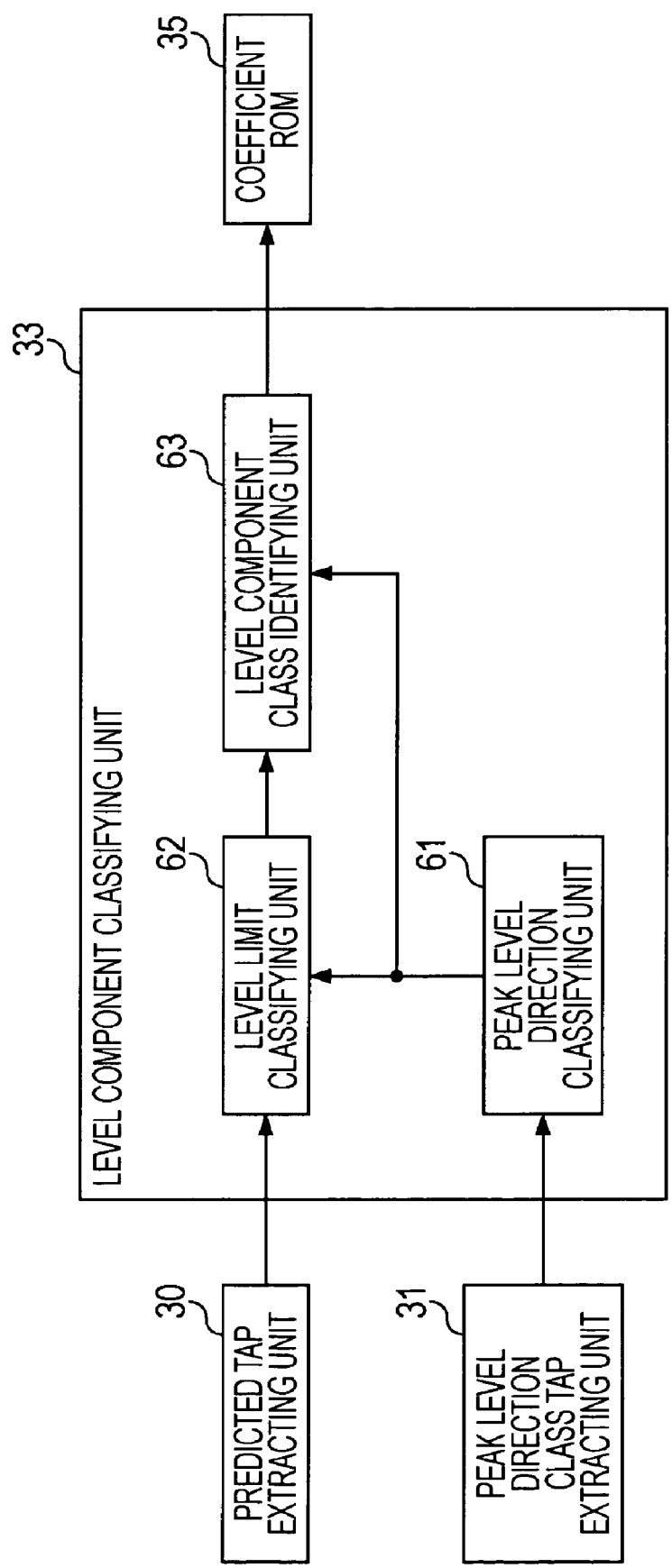

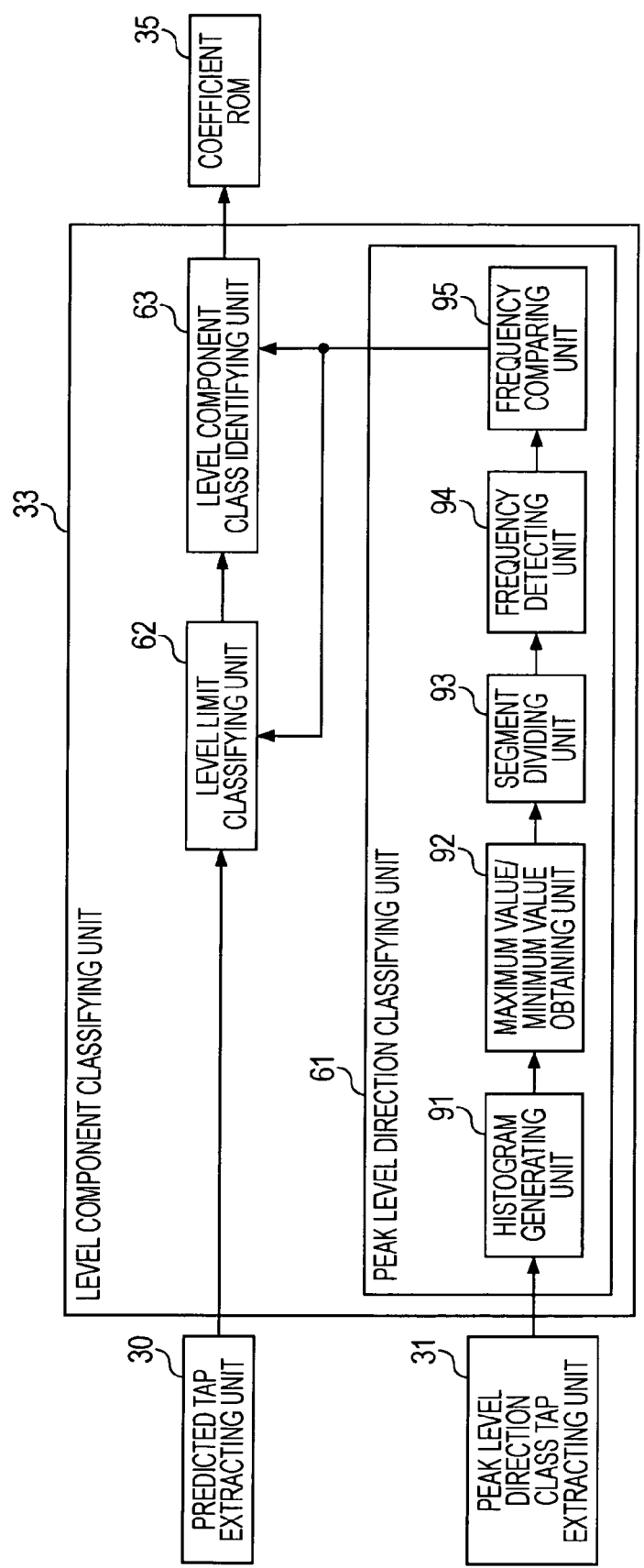

EXAMPLE OF WAVEFORM CLASS TAP

EXAMPLE OF LEVEL LIMIT CLASS TAP (PREDICTED TAP)

EXAMPLE OF PEAK LEVEL DIRECTION CLASS TAP

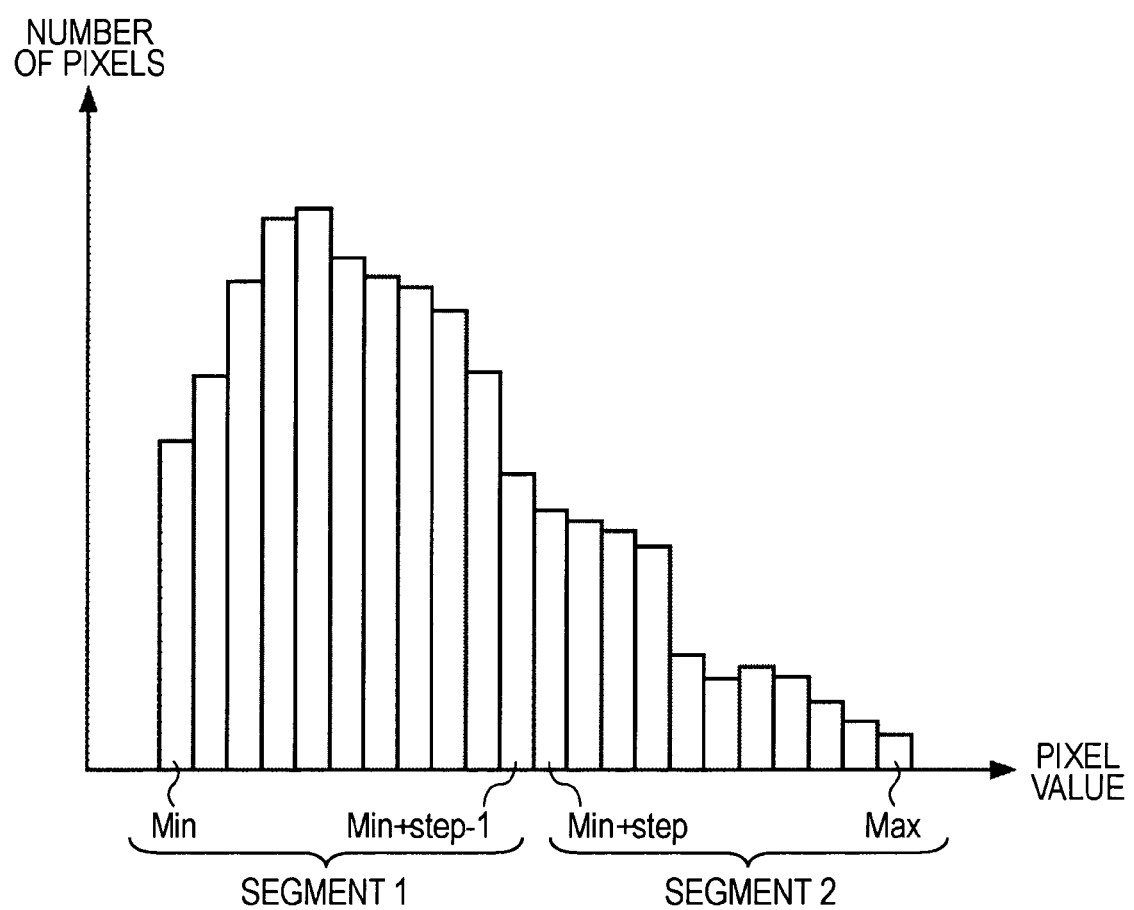

FIG. 11

| PEAK LEVEL DIRECTION CLASS CODE | SEGMENT 1 | SEGMENT 2 | PEAK LEVEL DIRECTION |
|---|---|---|---|
| P1 | 1 | 0 | UPPER DIRECTION |
| P2 | 0 | 1 | LOWER DIRECTION |
| P3 | 1 | 1 | BOTH DIRECTIONS |

FIG. 23

| EXISTENCE OF LEVEL COMPONENT CLASSIFYING | LESS THAN LOWER LIMIT LEVEL | AT OR HIGHER THAN UPPER LIMIT LEVEL |
|---|---|---|
| NO | 231687 | 896917 |
| YES | 160357 | 710933 |

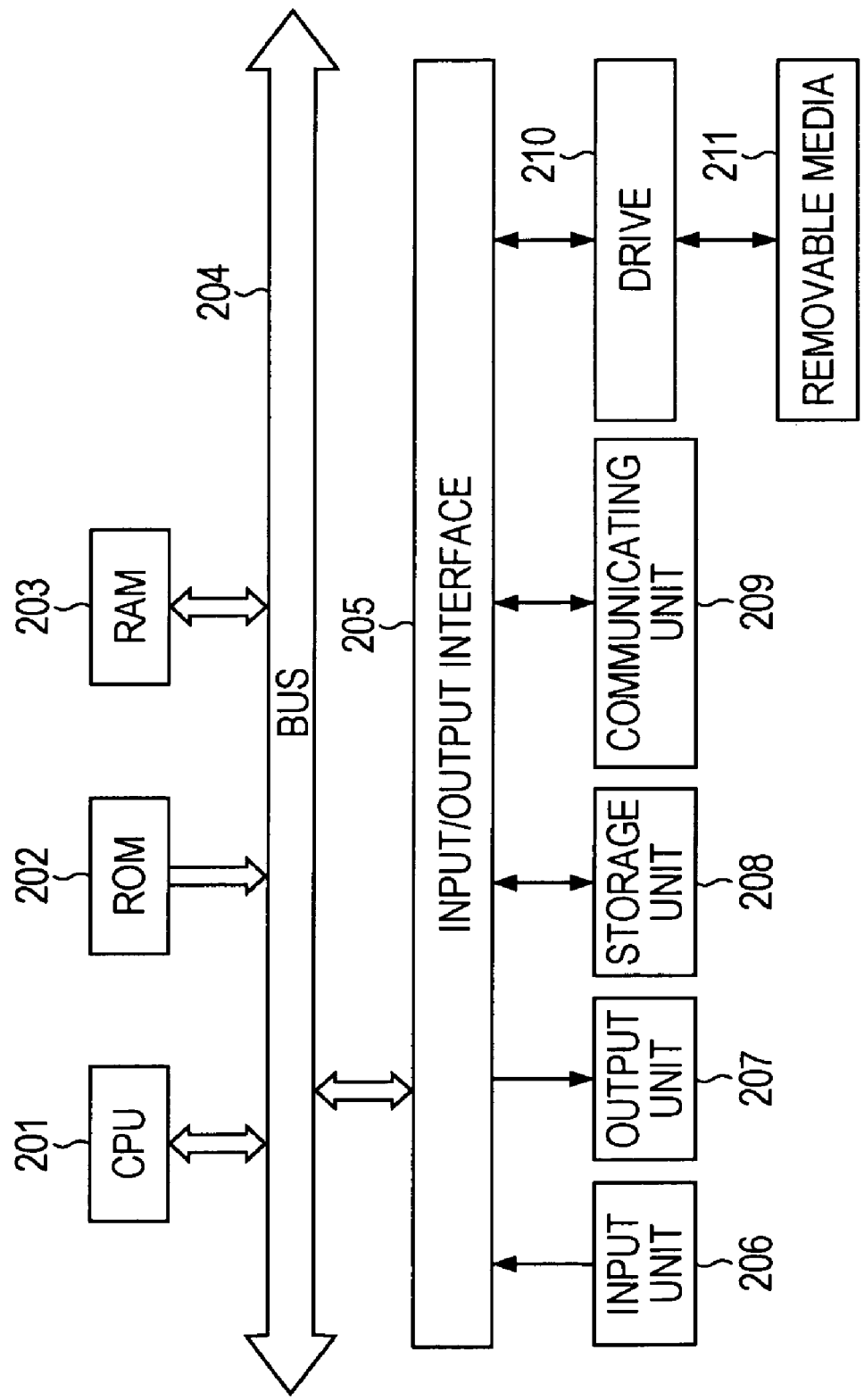

IMAGE PROCESSING DEVICE, IMAGE PROCESSING METHOD, LEARNING DEVICE, LEARNING METHOD, AND PROGRAM

CROSS REFERENCES TO RELATED APPLICATIONS

The present application claims priority from Japanese Patent Application No. JP 2008-064220, filed in the Japanese Patent Office on Mar. 13, 2008, the entire content of which is incorporated herein by reference.

BACKGROUND OF THE INVENTION

1. Field of the Invention

The present invention relates to an image processing device, image processing method, learning device, learning method, and program, and in particular relates to an image processing device, image processing method, learning device, learning method, and program wherein for example an image can be converted into a higher quality image.

2. Description of the Related Art

The present inventor has already proposed classification adaptive processing as a method to convert image data with low resolution to image data with a resolution of a higher resolution thereof (see Japanese Unexamined Patent Application Publication No. 5-328185).

With classification adaptive processing, for example, a pixel of image data with a high resolution to be predicted (hereafter, also referred to as "pixel of interest") is determined, and a pixel existing closest to the position of image data with low resolution, which is at the position of the pixel of interest, serves as a corresponding pixel to correspond to the pixel interest, whereby multiple pixels existing in the periphery of the corresponding pixel, including the corresponding pixel, are extracted as a class tap, and the pixel of interest is classified into one of multiple classes, based on the multiple pixels making up the class tap.

Also, with classification adaptive processing, multiple pixels existing in the periphery of a corresponding pixel, including the corresponding pixel of low-resolution image data corresponding to the position of the pixel of interest, are extracted as a predicted tap, whereby the pixel of interest is predicted (generated) by prediction computations using multiple pixels making up the predicted tap and a prediction coefficient corresponding to the class in which the pixel of interest is classified.

Note that the prediction coefficient is obtained beforehand with learning using tutor image data and student image data for learning.

SUMMARY OF THE INVENTION

FIG. 1 is a diagram showing the relation between an input signal input into an image processing device performing classification adaptive processing according to related art, and an output signal wherein classification adaptive processing is performed as to the input signal with the image processing device thereof and is output. In FIG. 1, the vertical axis shows the pixel value of the pixel. Note that the input signal and output signal are each 8-bit signals, and the pixel values of the input signal and output signal are expressed within the range of a lower limit level 0 to an upper limit level 255.

The input signal A shown on the lower left in FIG. 1 is a signal showing pixel values of multiple pixels wherein the pixel value is near the lower limit level 0, and is a signal having an upward peaking form. The output signal A' shown on the lower right in FIG. 1 shows a signal obtained by subjecting the input signal A to classification adaptive processing.

The input signal B shown on the upper left in FIG. 1 is a signal showing pixel values of multiple pixels wherein the pixel value is near the upper limit level 255, and is a signal having an upward peaking form. The output signal B' shown on the upper right in FIG. 1 shows a signal obtained by subjecting the input signal B to classification adaptive processing.

With classification adaptive processing according to related art, as shown in the lower right in FIG. 1, in the case that the pixel values of the pixels in output signal A' which is predicted by subjecting the input signal A to classification adaptive processing is within a permitted range that can be expressed with 8-bits (the range of at or above a lower limit level 0 and at or below an upper limit level 255), the output signal A' is output without change.

However, as shown in the upper right in FIG. 1, in the case that the pixel values of the pixels in the output signal B' predicted by subjecting the input signal B to classification adaptive processing rises above the upper limit level 255 and is outside the permitted range, the signal exceeding the upper limit level 255 is lowered down to the upper limit level 255 and output.

In this case, as a processing result of classification adaptive processing, a signal that completely differs from the originally intended output signal B' is output, and compared to outputting the output signal B' without change, the image quality is deteriorated.

In the case of subjecting an input signal having a upward peaking form to classification adaptive processing, generally, the pixel values greater than the pixel values of the input signal subject to processing are obtained as an output signal which is the processing result.

Accordingly, with the classification adaptive processing, the closer the distribution of pixel values of the input signal (input signal A or B) is to the upper limit level 255, the more often the pixel values of the output signal rise above the upper limit level 255, and the above-described image quality distortion can more readily occur.

Also, with the classification adaptive processing, as described later in FIGS. 2 and 3, the greater the dynamic range of the input signal is, the greater the pixel values of the output signal are. Accordingly, the greater the dynamic range of the input signal is, the more often the upper limit level 255 is exceeded, and again the above-described image quality distortion can more readily occur. Note that a dynamic range of an input signal means a value obtained by subtracting, out of pixels values of multiple pixels shown by the input signal, the minimum pixel value from the maximum pixel value.

Next, description will be given, with reference to FIGS. 2 and 3, to show that the greater the dynamic range of the input signal is, the greater the pixel values of the output signal are. FIG. 2 shows the relation between the dynamic range of an input signal and an output signal obtained from the input signal, in classification adaptive processing according to related art.

The input signal a shown on the left side in FIG. 2 shows the pixel values of 3 pixels $x_0$, $x_1$, and $x_2$, lined up in the horizontal direction, with the corresponding pixel $x_0$ as the center thereof. Also, the dynamic range $DR_\alpha$ of the input signal $\alpha$ is $\Delta x_1$.

The input signal $\beta$ shown on the right side in FIG. 2 shows the pixel values of 3 pixels $x_0$, $x_1$, and $x_2$, lined up in the horizontal direction, with the corresponding pixel $x_0$, which takes the same pixel value as the pixel value of the corresponding pixel $x_0$ shown on the left side in FIG. 2, as the center thereof. Also, the dynamic range $DR_\beta$ of the input signal $\beta$ is $2\Delta x_1$.

With classification adaptive processing according to related art, for example, an output signal is predicted with prediction computing (product-sum operation) of the multiple pixels $x_0$, $x_1$, and $x_2$ corresponding to the input signal and the prediction coefficients $w_0$, $w_1$, and $w_2$ obtained beforehand.

Accordingly, the output signal $y_1'$ predicted from the input signal $\alpha$ is $w_0 x_0 + w_1(x_0 - \Delta x_1) + w_2(x_0 - \Delta x_2) = (w_0 + w_1 + w_2)x_0 - (w_1 \Delta x_1 + w_2 \Delta x_2)$, and if we substitute $-(w_1 \Delta x_1 + w_2 \Delta x_2)$ as $\Delta y'$, the output signal becomes $y_1' \approx x_0 + \Delta y'$. Note that the prediction coefficients $w_0$, $w_1$, and $w_2$ satisfy $w_0 + w_1 + w_2 \approx 1.0$ and $w_1 \Delta x_1 + w_2 \Delta x_2 < 0$. Also, the output signal $y_2'$ predicted from the input signal $\beta$ is $w_0 x_0 + w_1(x_0 - 2\Delta x_1) + w_2(x_0 - 2\Delta x_2) = (w_0 + w_1 + w_2)x_0 - 2(w_1 \Delta x_1 + w_2 \Delta x_2) \approx x_0 + 2\Delta y'$. Accordingly, the greater the dynamic range of the input signal is, the greater the values that the output signal predicted from the input signal will have.

Next, FIG. 3 is a diagram to describe an output signal predicted from the input signal $\alpha$ and an output signal predicted from the input signal $\beta$, in the case that the corresponding pixel $x_0$ is near the upper limit level 255 and that the input signals $\alpha$ and $\beta$ in FIG. 2 are 8-bit signals. On the left side in FIG. 3, the output signal $y1'$ predicted from the input signal $\alpha$ is a value closer to the upper limit level 255, but since the value is at or below the upper limit level 255, this is within the permitted range.

On the right side in FIG. 3, the dynamic range $DR_\beta$ ($2\Delta x1$) of the input signal $\beta$ has a greater dynamic range than the dynamic range $DR_\alpha$ ($\Delta x1$) of the input signal $\alpha$, whereby the output signal $Y_2'$ predicted from the input signal $\beta$ is a greater value as compared to the output signal $y1'$ predicted from the input signal $\alpha$, the value rises above the upper limit level 255, and falls outside the permitted range.

Thus, even if the range from the corresponding pixel $x_0$ to the upper limit level 255 is the same, depending on the size of the dynamic range, the output signal predicted from the input signal can rise above the upper limit level 255. Accordingly, as described above, the greater the dynamic range of the input signal is, the pixel value of the output signal is more likely to exceed the upper limit level 255, whereby image quality deterioration more readily occurs.

Thus, generally, the greater the dynamic range of the input signal is, the output signal becomes a greater value, and has a tendency to rise above the upper limit level. Also, the closer the distribution of the pixel values of the input signal is to the upper limit level, the output signal has a tendency to rise above the upper limit level.

Note that in the case of performing classification adaptive processing as to an input signal having a downward peaking form, generally, pixel values that are smaller than the pixel values of the input signal to be processed are obtained as the output signal which is the processing result. Accordingly, similarly for the case wherein the input signal has a downward peaking form, the greater the dynamic range of the input signal is, or the closer the distribution of the pixel values of the input signal is to the lower limit level, the output signal has a tendency to fall below the lower limit level.

There has been found demand to enable a high quality image to be obtained by an arrangement such that the output signal does not rise above the upper limit level and does not fall below the lower limit level, as much as possible.

According to an embodiment of the present invention, an image processing device or program is an image processing device to convert a first image data into a second image data having a higher image quality, or a program that causes a computer to function as an image processing device to convert the first image data into the second image data having higher image quality, including: a predicted tap extracting unit to extract from the first image data multiple pixels existing in the periphery of a corresponding pixel, including the corresponding pixel of the first image data that corresponds to a pixel of interest, as a predicted tap to be used for prediction computing to predict such pixel of interest which is a pixel of the second image data on which to focus interest; a level limit class tap extracting unit to extract from the first image data multiple pixels existing in the periphery of the corresponding pixel, including the corresponding pixel, as a level limit class tap to be used for level limit classifying processing that classifies the pixel of interest into one of multiple level limit classes; a waveform class tap extracting unit to extract from the first image data multiple pixels existing in the periphery of the corresponding pixel, including the corresponding pixel, as a waveform class tap to be used for waveform pattern classifying processing that classifies the pixel of interest into one of multiple waveform pattern classes; a level limit classifying unit to perform the level limit classifying processing to classify the pixel of interest into one of multiple level limit classes, based on a ratio between a level width which expresses the size of a range wherein the pixel of interest can be taken and a dynamic range of the multiple pixels making up the level limit class tap, which is obtained according to a maximum value or minimum value of the pixel values of the multiple pixels making up the level limit class tap; a waveform pattern classifying unit to perform the waveform pattern classifying processing to classify the pixel of interest into one of multiple waveform pattern classes, based on a waveform expressing change to the multiple pixels making up the waveform class tap; a prediction coefficient output unit to output a prediction coefficient corresponding to a combination of a level limit class of the pixel of interest and a waveform pattern class of the pixel of interest, from among prediction coefficients corresponding respectively to multiple combinations of the level limit class and the waveform pattern class which are obtained and held beforehand by learning which minimizes the error difference between the result of the prediction computing using the first image data for learning and the second image data for learning which corresponds to the first image data for learning; and a prediction computing unit to predict the pixel of interest of the second image data by the prediction computing using the prediction coefficient output by the prediction coefficient output unit and the multiple pixels making up the prediction tap extracted by the prediction tap extracting unit.

The image processing device may further include: a peak level direction class tap extracting unit to extract from the first image data multiple pixels existing in the periphery of the corresponding pixel, including the corresponding pixel, as a peak level direction class tap for use with peak level direction classifying processing to classify the pixel of interest into one of multiple peak level direction classes; and a peak level direction classifying unit to perform the peak level direction classifying processing to classify the pixel of interest into one of multiple peak level direction classes, based on a histogram of the peak level direction class tap; with the level limit classifying unit having a level width computing unit to compute one of a range from the maximum value of the pixel values of the multiple pixels making up the level limit class tap up to an upper limit level of the pixel values that the pixel of interest can take, or a range from a lower level of the pixels values that the pixel of interest can take up to a minimum value of the pixel values of the multiple pixels making up the level limit class tap, as the level width; a dynamic range computing unit to compute a dynamic range of the multiple pixels making up the level limit class tap; and a level limit class identifying unit to identify the level limit class of the pixel of interest, based on the ratio of the dynamic range computed by the level width computed with the level width computing unit and the dynamic range computing unit.

Prediction coefficients obtained and held beforehand by the learning each may correspond to multiple combinations between the level limit class and the waveform pattern class, as well as the peak level direction class; and the prediction coefficient output unit may output a prediction coefficient corresponding to a combination of the level limit class of the pixel of interest and waveform pattern class of the pixel of interest, as well as the peak level direction class of the pixel of interest, from the prediction coefficients obtained and held beforehand by the learning.

According to an embodiment of the present invention, an image processing method is an image processing method for an image processing device to convert a first image data into a second image data having a higher image quality including the steps of: predicted tap extracting to extract from the first image data multiple pixels existing in the periphery of a corresponding pixel, including the corresponding pixel of the first image data that corresponds to a pixel of interest, as a predicted tap to be used for prediction computing to predict such pixel of interest which is a pixel of the second image data on which to focus interest; level limit class tap extracting to extract from the first image data multiple pixels existing in the periphery of the corresponding pixel, including the corresponding pixel, as a level limit class tap to be used for level limit classifying processing that classifies the pixel of interest into one of multiple level limit classes; waveform class tap extracting to extract from the first image data multiple pixels existing in the periphery of the corresponding pixel, including the corresponding pixel, as a waveform class tap to be used for waveform pattern classifying processing that classifies the pixel of interest into one of multiple waveform pattern classes; level limit classifying to perform the level limit classifying processing to classify the pixel of interest into one of multiple level limit classes, based on a ratio between a level width which expresses the size of a range wherein the pixel of interest can be taken and a dynamic range of the multiple pixels making up the level limit class tap, which is obtained according to a maximum value or minimum value of the pixel values of the multiple pixels making up the level limit class tap; waveform pattern classifying to perform the waveform pattern classifying processing to classify the pixel of interest into one of multiple waveform pattern classes, based on a waveform expressing change to the multiple pixels making up the waveform class tap; prediction coefficient outputting to output a prediction coefficient corresponding to a combination of a level limit class of the pixel of interest and a waveform pattern class of the pixel of interest, from among prediction coefficients corresponding respectively to multiple combinations of the level limit class and the waveform pattern class which are obtained and held beforehand by learning which minimizes the error difference between the result of the prediction computing using the first image data for learning and the second image data for learning which corresponds to the first image data for learning; and prediction computing to predict the pixel of interest of the second image data by the prediction computing using the prediction coefficient output in the prediction coefficient output step and the multiple pixels making up the prediction tap extracted in the prediction tap extracting step.

According to an embodiment of the present invention, multiple pixels existing in the periphery of a corresponding pixel, including the corresponding pixel of the first image data that corresponds to a pixel of interest, are extracted from the first image data as a predicted tap to be used for prediction computing to predict such pixel of interest which is a pixel on which to focus of the second image data; multiple pixels existing in the periphery of the corresponding pixel, including the corresponding pixel, are extracted from the first image data as a level limit class tap to be used for level limit classifying processing that classifies the pixel of interest into one of multiple level limit classes; multiple pixels existing in the periphery of the corresponding pixel, including the corresponding pixel, are extracted from the first image data as a waveform class tap to be used for waveform pattern classifying processing that classifies the pixel of interest into one of multiple waveform pattern classes; level limit classifying processing is performed to classify the pixel of interest into one of multiple level limit classes, based on a ratio between a level width which expresses the size of a range wherein the pixel of interest can be taken and a dynamic range of the multiple pixels making up the level limit class tap, which is obtained according to a maximum value or minimum value of the pixel values of the multiple pixels making up the level limit class tap; and waveform pattern classifying processing is performed to classify the pixel of interest into one of multiple waveform pattern classes, based on a waveform expressing change to the multiple pixels making up the waveform class tap. prediction coefficients are output corresponding to a combination of a level limit class of the pixel of interest and a waveform pattern class of the pixel of interest, from among prediction coefficients corresponding respectively to multiple combinations of the level limit class and the waveform pattern class which are obtained and held beforehand by learning which minimizes the error difference between the result of the prediction computing using the first image data for learning and the second image data for learning which corresponds to the first image data for learning; and the pixel of interest of the second image data is predicted with the prediction computing using the prediction coefficient and the multiple pixels making up the prediction tap.

According to an embodiment of the present invention, a learning device or a program is a learning device to obtain a prediction coefficient to be used for prediction computing with image processing to convert a first image data into a second image data having a higher image quality, by learning that minimizes error difference between results of the prediction computing using the first image data for learning and the second image data for learning that corresponds to the first image data for learning, or a program causing a computer to function as a learning device to obtain a prediction coefficient to be used for prediction computing with image processing to convert a first image data into a second image data having a higher image quality, by learning that minimizes error difference between results of the prediction computing using the first image data for learning and the second image data for learning that corresponds to the first image data for learning, including: a predicted tap extracting unit to extract from the first image data for learning multiple pixels existing in the periphery of a corresponding pixel, including the corresponding pixel of the first image data for learning that corresponds to a pixel of interest, as a predicted tap to be used for prediction computing to predict such pixel of interest which is a pixel on which to focus of the second image data for learning; a level limit class tap extracting unit to extract from the first image data for learning multiple pixels existing in the periphery of the corresponding pixel, including the corresponding pixel, as a level limit class tap to be used for level limit classifying processing that classifies the pixel of interest into one of multiple level limit classes; a waveform class tap extracting unit to extract from the first image data for learning multiple pixels existing in the periphery of the corresponding pixel, including the corresponding pixel, as a waveform class tap to be used for waveform pattern classifying processing that classifies the pixel of interest into one of multiple waveform pattern classes; a level limit classifying unit to perform the level limit classifying processing to classify the pixel of interest into one of multiple level limit classes, based on a ratio between a level width which expresses the size of a range wherein the pixel of interest can be taken and a dynamic range of the level limit class tap, which is obtained according to a maximum value or minimum value of the pixel values of the multiple pixels making up the level limit class tap; a waveform pattern classifying unit to perform the waveform pattern classifying processing to classify the pixel of interest into one of multiple waveform pattern classes, based on a waveform expressing change to the multiple pixels making up the waveform class tap; and a prediction coefficient computing unit to obtain a prediction coefficient which minimizes the error difference between the results of the prediction computing using the prediction tap and the pixel of interest, for each combination of the level limit class of the pixel of interest and the waveform pattern class of the pixel of interest.

The learning device may further include: a peak level direction class tap extracting unit to extract from the first image data for learning multiple pixels existing in the periphery of the corresponding pixel, including the corresponding pixel, as a peak level direction class tap for use with peak level direction classifying processing to classify the pixel of interest into one of multiple peak level direction classes; and a peak level direction classifying unit to perform the peak level direction classifying processing to classify the pixel of interest into one of multiple peak level direction classes, based on a histogram of the peak level direction class tap; with the level limit classifying unit having a level width computing unit to compute one of a range from the maximum value of the pixel values of the multiple pixels making up the level limit class tap up to an upper limit level of the pixel values that the pixel of interest can take, or a range from a lower level of the pixels values that the pixel of interest can take up to a minimum value of the pixel values of the multiple pixels making up the level limit class tap, as the level width; a dynamic range computing unit to compute a dynamic range of the multiple pixels making up the level limit class tap; and a level limit class identifying unit to identify the level limit class of the pixel of interest, based on the ratio of the dynamic range computed by the level width computed with the level width computing unit and the dynamic range computing unit.

The prediction coefficient computing unit may obtain the prediction coefficient that minimizes the error difference between the results of the prediction computing using the prediction tap and the pixel of interest, for each combination of level limit class of the pixel of interest and waveform pattern class of the pixel of interest, as well as the peak level direction class of the pixel of interest.

According to an embodiment of the present invention, a learning method is a learning method of a learning device to obtain a prediction coefficient to be used for prediction computing with image processing to convert a first image data into a second image data having a higher image quality, by learning that minimizes error difference between results of the prediction computing using the first image data for learning and the second image data for learning that corresponds to the first image data for learning, including the steps of: predicted tap extracting to extract from the first image data for learning multiple pixels existing in the periphery of a corresponding pixel, including the corresponding pixel of the first image data for learning that corresponds to a pixel of interest, as a predicted tap to be used for prediction computing to predict such pixel of interest which is a pixel on which to focus of the second image data for learning; level limit class tap extracting to extract from the first image data for learning multiple pixels existing in the periphery of the corresponding pixel, including the corresponding pixel, as a level limit class tap to be used for level limit classifying processing that classifies the pixel of interest into one of multiple level limit classes; waveform class tap extracting to extract from the first image data for learning multiple pixels existing in the periphery of the corresponding pixel, including the corresponding pixel, as a waveform class tap to be used for waveform pattern classifying processing that classifies the pixel of interest into one of multiple waveform pattern classes; level limit classifying to perform the level limit classifying processing to classify the pixel of interest into one of multiple level limit classes, based on a ratio between a level width which expresses the size of a range wherein the pixel of interest can be taken and a dynamic range of the level limit class tap, which is obtained according to a maximum value or minimum value of the pixel values of the multiple pixels making up the level limit class tap; waveform pattern classifying to perform the waveform pattern classifying processing to classify the pixel of interest into one of multiple waveform pattern classes, based on a waveform expressing change to the multiple pixels making up the waveform class tap; and prediction coefficient computing to obtain a prediction coefficient which minimizes the error difference between the results of the prediction computing using the prediction tap and the pixel of interest, for each combination of the level limit class of the pixel of interest and the waveform pattern class of the pixel of interest.

According to an embodiment of the present invention multiple pixels existing in the periphery of a corresponding pixel, including the corresponding pixel of the first image data for learning that corresponds to a pixel of interest, are extracted from the first image data for learning as a predicted tap to be used for prediction computing to predict such pixel of interest which is a pixel on which to focus of the second image data for learning; multiple pixels existing in the periphery of the corresponding pixel, including the corresponding pixel, are extracted from the first image data for learning as a level limit class tap to be used for level limit classifying processing that classifies the pixel of interest into one of multiple level limit classes; multiple pixels existing in the periphery of the corresponding pixel, including the corresponding pixel, are extracted from the first image data for learning as a waveform class tap to be used for waveform pattern classifying processing that classifies the pixel of interest into one of multiple waveform pattern classes; level limit classifying processing is performed to classify the pixel of interest into one of multiple level limit classes, based on a ratio between a level width which expresses the size of a range wherein the pixel of interest can be taken and a dynamic range of the level limit class tap, which is obtained according to a maximum value or minimum value of the pixel values of the multiple pixels making up the level limit class tap; waveform pattern classifying processing is performed to classify the pixel of interest into one of multiple waveform pattern classes, based on a waveform expressing change to the multiple pixels making up the waveform class tap; and a prediction coefficient is obtained which minimizes the error difference between the results of the prediction computing using the prediction tap and the pixel of interest, for each combination of the level limit class of the pixel of interest and the waveform pattern class of the pixel of interest.

According to the above configurations, a higher quality image can be predicted, and a prediction coefficient for predicting a higher quality image can be learned.

BRIEF DESCRIPTION OF THE DRAWINGS

FIG. 6 is a block diagram illustrating a detailed configuration example of the level component class classifying unit in FIG. 5;

FIG. 7 is a block diagram illustrating a detailed configuration example of the peak level direction classifying unit in FIG. 6;

FIG. 9 is a diagram illustrating an example of a histogram;

FIG. 11 is a diagram illustrating a peak level direction class code;

FIG. 23 is a diagram illustrating results of a simulation; and

FIG. 24 is a diagram illustrating a configuration example of a computer.

DESCRIPTION OF THE PREFERRED EMBODIMENTS

Embodiments according to the present invention will be described below with reference to the appended diagrams.

Figure 4:
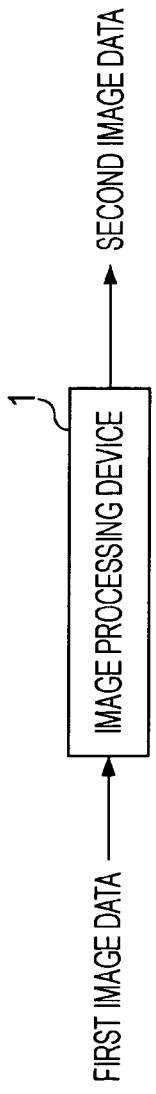
FIG. 4 is a block diagram of the image processing device according to an embodiment of the present invention.

FIG. 4 shows a configuration example of an image processing device which is an embodiment of the present invention.

An image processing device 1 performs image conversion processing to convert first image data into second image data having higher image quality. The image processing device 1 can realize various image conversion processing, depending on how the first and second image data are defined. That is to say, for example, if we say that the first image data is low-resolution image data and the second image data is high-resolution image data with a resolution thereof higher than that of the first image data, we can say that the image conversion processing is resolution improvement processing to improve resolution and improve image quality.

Also, for example, if we say that the first image data is low-SNR (Signal to Noise Ratio) image data and the second image data is high-SNR image data with an SNR thereof higher than that of the first image data, we can say that the image conversion processing is noise removal processing to reduce noise and improve image quality.

Further, for example, if we say that the first image data is SD (Standard Definition) image data and the second image data is HD (High Definition) image data wherein the pixel count and resolution is greater than that of the first image data, we can say that the image conversion processing is conversion processing to improve image quality from the SD image data to the HD image data.

Image conversion processing in the image processing device 1, with the first image data serving as low-resolution image data and with the second image data as high-resolution data having a resolution thereof higher than that of the first image data, will be described below.

Figure 5:
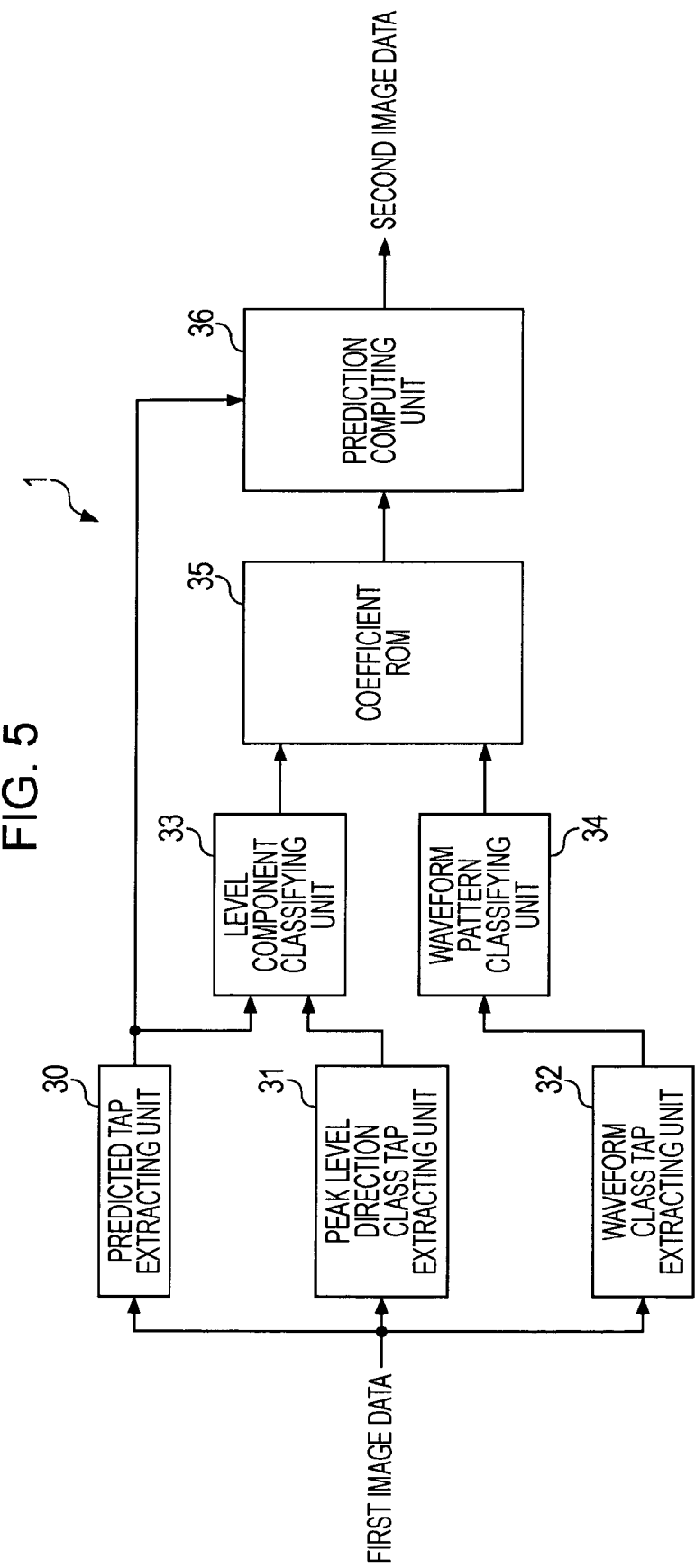
FIG. 5 is a block diagram illustrating a detailed configuration example of the image processing device in FIG. 4.

FIG. 5 shows a detailed configuration example of the image processing device 1. The image processing device 1 is made up of a predicted tap extracting unit 30, peak level direction class tap extracting unit 31, waveform class tap extracting unit 32, level component classifying unit 33, waveform pattern classifying unit 34, coefficient ROM (Read Only Memory) 35, and prediction computing unit 36. With the image processing device 1, the first image data input from the outside is supplied to the predicted tap extracting unit 30, peak level direction class tap extracting unit 31, and waveform class tap extracting unit 32.

The predicted tap extracting unit 30 takes the pixels making up the second image data serving as conversion results of the first image data as pixels of interest, sequentially, in raster scan order, for example. The predicted tap extracting unit 30 extracts (the pixel values of) the multiple pixels existing in the periphery of a corresponding pixel, including the corresponding pixel of the first image data corresponding to the pixel of interest, as predicted tap to be used for prediction computing to compute (the pixel values of) the pixel of interest, i.e. extracts the multiple pixels in a position that is spatially or temporally near the position of the first image data equating to the position of the pixel of interest, from the supplied first image data, and supplies this to the prediction computing unit 36. Note that the corresponding pixel is a pixel of the first image data existing nearest the position of the first image data which is at the position of the pixel of interest.

Figure 8C:
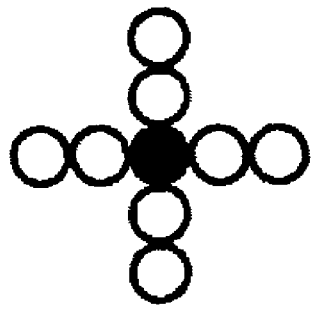
FIGS. 8A through 8C are diagrams illustrating an example of a peak level direction class tap, level limit class tap, and waveform class tap.
Figure 8B:
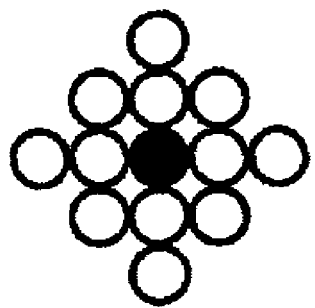

Also, the predicted tap extracting unit 30 supplies the predicted tap extracted from the first image data to the level component classifying unit 33, as a level limit class tap for use in the level limit classifying processing included in the level component classifying processing wherein the pixel of interest is classified into one of multiple level component classes (FIG. 8B to be described later).

The level limit class tap can have a tap configuration that is the same as the prediction tap (same positional relation as to the pixel of interest), and can have a different tap configuration, but the prediction tap and level limit class tap are desired to have the same tap configuration. Accordingly, with the present embodiment, the predicted tap is supplied to the level component classifying unit 33 as a level limit class tap at the predicted tap extracting unit 30.

The peak level direction class tap extracting unit 31 extracts multiple pixels existing in the periphery of a corresponding pixel, including the corresponding pixel, from the supplied first image data, as a peak level direction class tap for use in peak level direction classifying processing included in the level component classifying processing wherein the pixel of interest is classified into one of multiple level component classes, and supplies this to the level component classifying unit 33.

The waveform class tap extracting unit 32 extracts multiple pixels existing in the periphery of a corresponding pixel, including the corresponding pixel, from the supplied first image data, as a waveform class tap for use in waveform pattern classifying processing wherein the pixel of interest is classified into one of multiple waveform pattern classes, and supplies this to the waveform pattern classifying unit 34.

The level component classifying unit 33 performs level component classifying processing to classify the pixel of interest into one of multiple level component classes, based on the level limit class tap from the predicted tap extracting unit 30 and the peak level direction class tap from the peak level direction class tap extracting unit 31, and supplies the level component class code corresponding to the level component class of the pixel of interest obtained as a result thereof to the coefficient ROM 35. Note that details of the level component classifying unit 33 are described with reference to FIGS. 6 through 15.

The waveform pattern classifying unit 34 performs waveform pattern classifying processing to classify the pixel of interest into a class expressing the features of the waveform of the waveform class tap from the waveform class tap extracting unit 32, based on a waveform expressing changes to the pixel values of the multiple pixels making up the waveform class tap from the waveform class tap extracting unit 32, and supplies the waveform pattern class code corresponding to the waveform pattern class of the pixel value obtained as a result thereof to the coefficient ROM 35.

Now, as a method to perform waveform pattern classifying processing, for example ADRC (Adaptive Dynamic Range Coding) or the like may be employed. With a method using ADRC, the pixel values of the pixels making up the waveform class tap are subjected to ADRC processing, whereby a waveform pattern class of the pixels of value is determined according to the ADRC code obtained as a result thereof.

Note that with K-bit ADRC, for example, a maximum value MAX and minimum value MIN of the pixel values of the pixels making up the waveform class tap are detected, whereby DR=MAX−MIN is a local dynamic range of a group of pixels making up the waveform class tap, and based on this dynamic range DR, (the pixel values of) the pixels making up the waveform class tap are quantized again into K bits. That is to say, the minimum value MIN is subtracted from the pixel value of the various pixels making up the waveform class tap, and the subtracted value thereof is divided (quantized) by $DR/2^K$.

Thus, a bit row is output as an ADRC code, wherein the pixel values of the various pixels of K bits making up the waveform class tap obtained as described above are lined up in a predetermined order. Accordingly, in the case that the waveform class tap is subjected to 1-bit ADRC processing, for example, the pixel values of the various pixels making up the waveform class tap is divided by ½ the difference between the maximum value MAX and minimum value MIN after the minimum value MIN is subtracted (rounded up from the decimal point), whereby the pixel values of the various pixels are each 1 bit (binarized). The bit row wherein the 1-bit pixel values are lined up in a predetermined order is then output as an ADRC code.

Note that a level distribution pattern of the pixel values of the pixels making up the waveform class tap can also be output without change to the waveform pattern classifying unit 34 as a waveform pattern class code. However, in this case, the waveform class tap is made up of the pixel values of N pixels, and if K bits are assigned to the pixel values of the various pixels, the number in the case of a waveform pattern class code output by the waveform pattern classifying unit 34 becomes $(2^N)^K$ ways, thereby becoming an enormous number exponentially proportional to the bit number K of the pixel values of the pixels.

Accordingly, with the waveform pattern classifying unit 34, it is desirable for the information volume of the waveform class tap to be compressed by the ADRC processing described above or by vector quantizing or the like to perform waveform pattern classifying processing.

The coefficient ROM 35 stores (holds) a set of prediction coefficients each corresponding to multiple combinations of the level component class and waveform pattern class obtained beforehand by later-described learning. Also, the coefficient ROM 35 outputs a prediction coefficient stored in the address corresponding to a combination of a level component class code from the level component classifying unit 33 and a waveform pattern class code from the waveform pattern classifying unit 34 of the set of stored prediction coefficients (prediction coefficient corresponding to a combination of a level component class expressed by a level class code from the level component classifying unit 33 and a waveform pattern class expressed by a waveform pattern class code from the waveform pattern classifying unit 34) to the prediction computing unit 36.

The prediction computing unit 36 uses the multiple pixels making up the predicted tap from the predicted tap extracting unit 30 and the prediction coefficient that the coefficient ROM 35 outputs, and performs predetermined prediction computing to predict (generate) the pixel of interest (e.g. linear computing). Thus, the prediction computing unit 36 obtains and outputs (the predicted values of) the pixel values of the pixel of interest, i.e. the pixel values of the pixels making up the second image data.

FIG. 6 shows a detailed configuration example of the level component classifying unit 33 in FIG. 5. The level component classifying unit 33 is made up of a peak level direction classifying unit 61, level limit classifying unit 62, and level component class identifying unit 63.

A peak level direction class tap is supplied to the peak level direction classifying unit 61 from the peak level direction class tap extracting unit 31. The peak level direction classifying unit 61 performs peak level direction classifying processing to classify the pixel of interest into a class expressing the peak level direction of the peak level direction class tap from the peak level direction tap extracting unit 31, of the multiple leak level direction classes, based on a histogram of pixel values of the multiple pixels making up the peak level direction class tap from the peak level direction class tap extracting unit 31.

Figure 1:
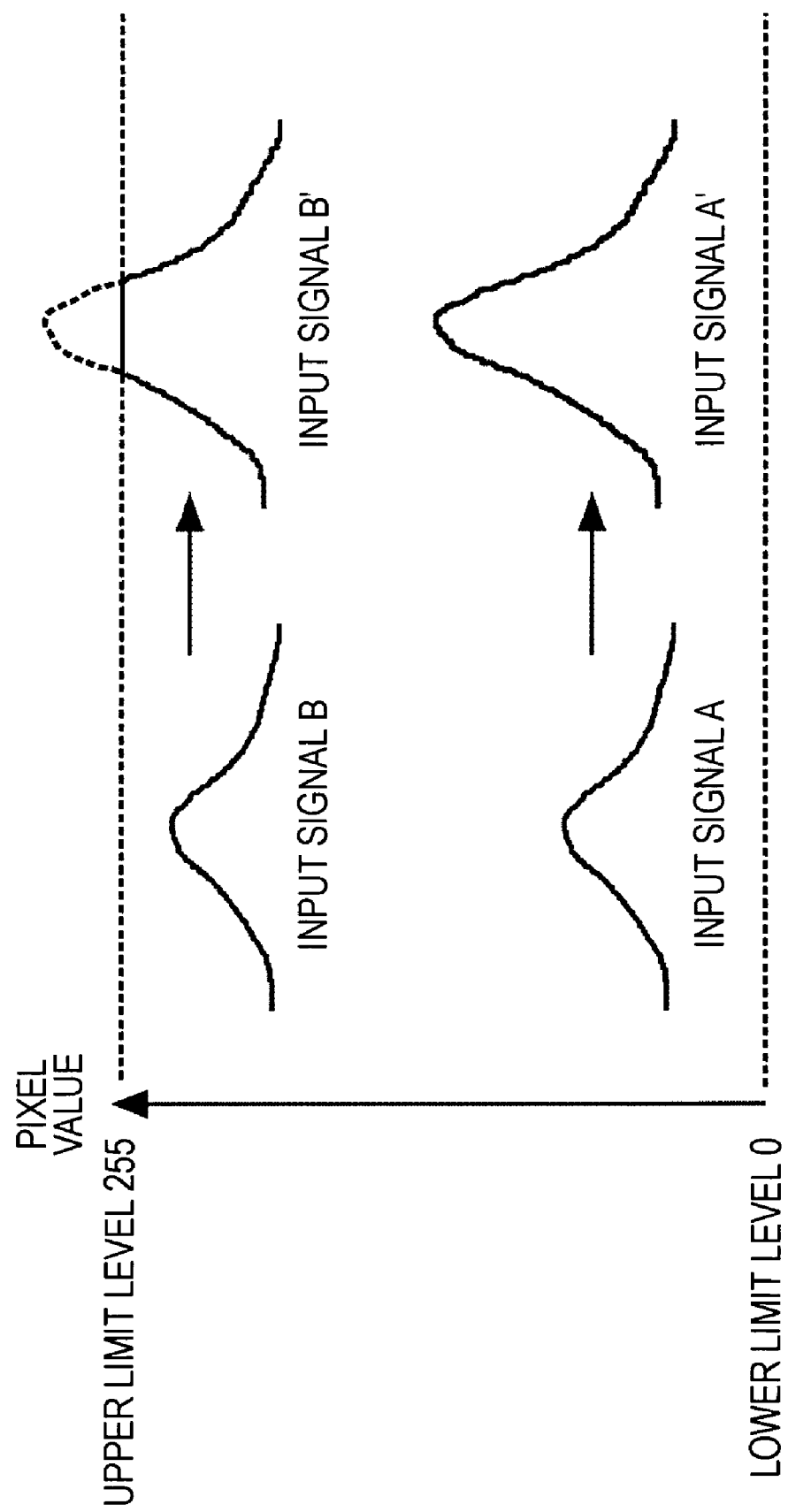
FIG. 1 is a diagram illustrating the relation between an input signal and an output signal.
Figure 2:
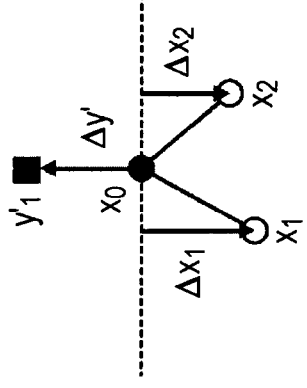
FIG. 2 is a diagram illustrating the relation between the dynamic range of the input signal and the output signal obtained from the input signal.
Figure 3:
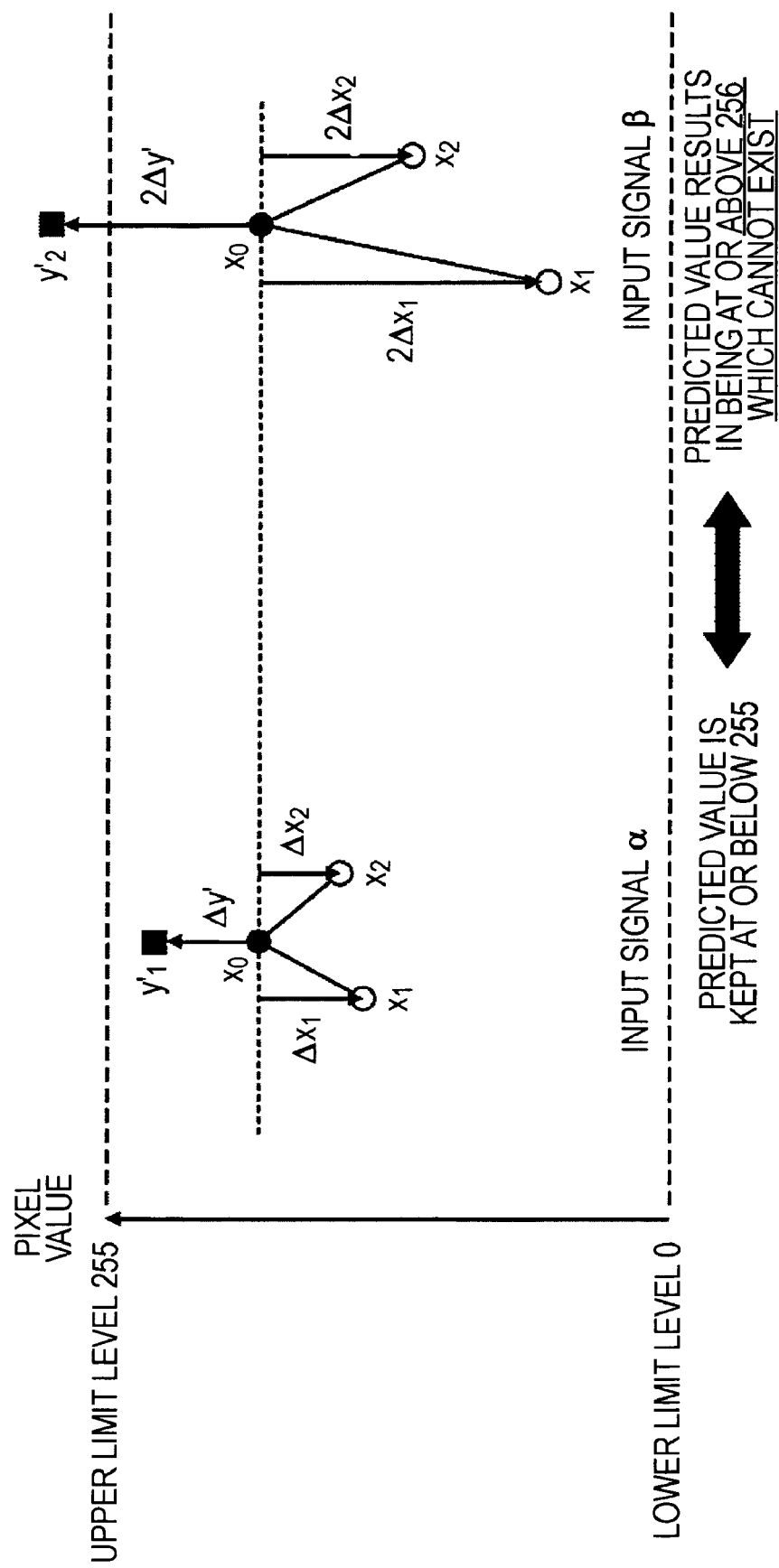
FIG. 3 is a diagram illustrating the output signal obtained from an input signal α and the output signal obtained from an input signal β.

Note that the peak level direction is a direction wherein the peak level (peak value) exists for the pixel values of the multiple pixels making up the peak level direction class tap. Specifically, for example, as shown in FIG. 1, in the case of a vertical axis wherein the pixel values are expressed taken in the upper/lower directions, and the vertical axis is such that the pixel values are greater the farther upward, and a horizontal axis is taken wherein the pixel positions are expressed in the left/right directions, a peak level direction is a direction wherein the waveform expressing change to the pixel values of the multiple pixels making up the peak level direction class tap (hereafter also referred to as "peak level direction class tap waveform") is in a upward peaking shape.

Accordingly, in the case that the peak level direction class tap waveform is in an upward peaking shape, the peak level direction of the peak level direction class tap is in the upward direction. In this case, the pixel of interest is classified into the peak level direction class expressing that the peak level direction is the upward direction.

Also, in the case that the peak level direction class tap waveform is in a downward peaking shape, the peak level direction of the peak level direction class tap is in the downward direction. In this case, the pixel of interest is classified into the peak level direction class expressing that the peak level direction is the downward direction.

Further, in the case that the waveform of the peak level direction class tap is a waveform that is peaking in both the upward and downward directions, the peak level direction for the peak level direction class tap is both directions of the upward direction and downward direction. In this case, the pixel of interest is classified into the peak level direction class expressing that the peak level direction is both directions.

The peak level direction classifying unit 61 supplies the peak level direction class code corresponding to the peak level direction class of the pixel of interest obtained from the peak level direction classifying processing to the level limit classifying unit 62 and level component class identifying unit 63.

The level limit classifying unit 62 subjects the pixel of interest to level limit classifying processing that classifies the pixel of interest into a class corresponding to the ratio of a permitted level width LW and dynamic range DR, of the multiple level limit classes, based on the ratio between the permitted level width LW that is obtained according to the peak level direction expressed by the peak level direction class code from the peak level direction classifying unit 61 and the level limit class tap from the predicted tap extracting unit 30, and the dynamic range DR of the level limit class tap from the predicted tap extracting unit 30.

Now, the permitted level width LW is a size (width) of range wherein the true value of the pixel value exists, of a range from the maximum value of the pixel values of the multiple pixels making up the level limit class tap up to the upper limit level expressing the upper limit of the pixel values which the pixel of interest, which is predicted with predetermined prediction computing, can take, and a range from the lower limit level expressing the lower limit of the pixel values which the pixel of interest, which is predicted with predetermined prediction computing, can take, down to the minimum value of the pixel values of the multiple pixels making up the level limit class tap.

The level limit classifying unit 62 supplies the level limit class code corresponding to the level limit class of the pixel of interest obtained by the level limit classifying processing to the level component class identifying unit 63.

The level component class identifying unit 63 identifies the level component class of the pixel of interest from multiple level component classes, based on a combination of a peak level direction class code from the peak level direction classifying unit 61 and a level limit class code from the level limit classifying unit 62. The level component class identifying unit 63 outputs the level component class code corresponding to the level component class of the identified pixel of interest to the coefficient ROM 35.

Next, FIG. 7 shows a detailed configuration example of the peak level direction classifying unit 61 in FIG. 6. The peak level direction classifying unit 61 is made up of a histogram generating unit 91, maximum value/minimum value obtaining unit 92, segment dividing unit 93, frequency detecting unit 94, and frequency comparing unit 95.

A peak level direction class tap from the peak level direction class tap extracting unit 31 is supplied to the histogram generating unit 91. The histogram generating unit 91 generates a histogram of pixel values of the multiple pixels making up the peak level direction class tap from the peak level direction class tap extracting unit 31, and supplies this to the maximum value/minimum value obtaining unit 92.

The maximum value/minimum value obtaining unit 92 obtains (detects) the maximum pixel value Max and minimum pixel value Min from the pixel values of the multiple pixels making up the peak level direction class tap, based on the histogram of the peak level direction class tap from the histogram generating unit 91, and supplies this to the segment dividing unit 93 along with the histogram from the histogram generating unit 91.

The segment dividing unit 93 computes a segment width step by applying the following Expression (1) as to the maximum pixel value Max and minimum pixel value Min from the maximum value/minimum value obtaining unit 92, divides the histogram from the maximum value/minimum value obtaining unit 92 into two segments of a segment 1 (segment with small pixel value) in the following Expression (2) and a segment 2 (segment with large pixel value) in Expression (3), and supplies this to the frequency detecting unit 93.

$$\text{step}=[\text{Max}-\text{Min}+1]/2 \tag{1}$$

Note that "[ ]" are Gaussian symbols, and accordingly [Max−Min+1] shows the integer portion of Max−Min+1.

$$\text{Segment 1: Min}\sim\text{Min}+\text{step}-1 \tag{2}$$

$$\text{Segment 2: Min}+\text{step}\sim\text{Max} \tag{3}$$

The frequency detecting unit 94 detects the number of pixels within the segment 1 as frequency $\text{Freq}_1$ and detects the number of pixels within the segment 2 as frequency $\text{Freq}_2$, based on the histogram divided into the segment 1 and segment 2 from the segment dividing unit 93, and supplies this to the frequency comparing unit 95.

The frequency comparing unit 95 compares the frequency $\text{Freq}_n$ (n=1, 2) from the frequency detecting unit 94 and a threshold $\text{Freq}_{th}$, thereby determining whether or not the following Expression (4) is satisfied, and based on the determination results thereof, recognizes (detects) the peak level direction of the peak level direction class tap.

$$\text{Freq}_n \geq \text{Freq}_{th}(n=1, 2) \tag{4}$$

The threshold $\text{Freq}_{th}$ is a value obtained by dividing, of the frequency $\text{Freq}_1$ and frequency $\text{Freq}_2$, the frequency with the greater value, by an arbitrary positive integer Z, and n takes the values 1 and 2. Note that simulation indicates that as a value to set for Z, desirable results can be obtained by employing 2, for example.

That is to say, for example, in the case that the frequency $\text{Freq}_1$ is at or above the threshold $\text{Freq}_{th}$, and the frequency $\text{Freq}_2$ is below the threshold $\text{Freq}_{th}$, the pixel values of the multiple pixels making up the peak level direction class tap are such that many pixel values are skewed to the segment 1 having small pixel values.

In this case, the waveform of the peak level direction class tap becomes a waveform with an upward peaking form, whereby the frequency comparing unit 95 can recognize the peak level direction of the peak level direction class tap as the upward direction.

Also for example, in the case that the frequency $Freq_1$ is below the threshold $Freq_{th}$, and the frequency $Freq_2$ is at or above the threshold $Freq_{th}$, the pixel values of the multiple pixels making up the peak level direction class tap are such that many pixel values are skewed to the segment 2 having large pixel values.

In this case, the waveform of the peak level direction class tap becomes a waveform with a downward peaking form, whereby the frequency comparing unit 95 can recognize the peak level direction of the peak level direction class tap as the downward direction.

Further, for example, in the case that the frequency $Freq_1$ is at or above the threshold $Freq_{th}$, and the frequency $Freq_2$ is at or above the threshold $Freq_{th}$, the pixel values of the multiple pixels making up the peak level direction class tap exist in roughly similar amounts in the segment 1 having small pixel values and in the segment 2 having large pixel values.

In this case, the waveform in the peak level direction class tap is waveform with an upward peaking and downward peaking form, whereby the frequency comparing unit 95 recognizes that the peak level direction of the peak level direction class tap is both directions of the upward direction and downward direction.

The frequency comparing unit 95 classifies the pixel of interest into a class expressing the peak direction (upward direction, downward direction, or both directions) recognized by the waveform of the peak level direction class tap, out of the multiple peak level direction classes, based on the peak level direction recognized from the waveform of the peak level direction class tap, and outputs the peak level direction class code corresponding to the peak level direction class of the pixel of interest obtained by such classifying, to the level limit classifying unit 62 and level component class specifying unit 63.

Figure 8A:
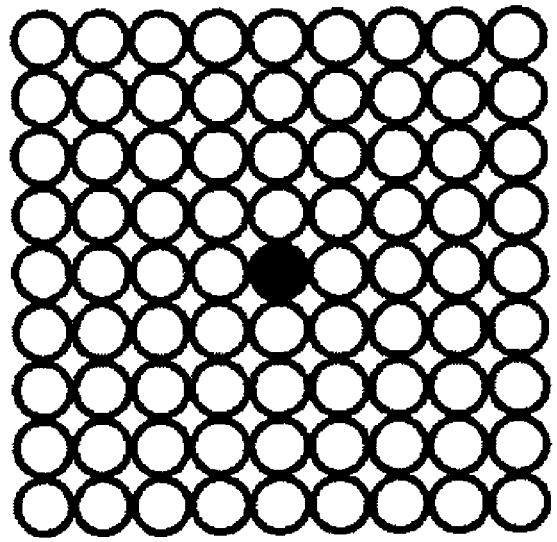

FIGS. 8A through 8C show an example of a level limit class tap extracted by the predicted tap extracting unit 30, a peak level direction class tap extracted by the peak level direction class tap extracting unit 31, and waveform class tap extracted by the waveform class tap extracting unit 32.

FIG. 8A shows a peak level direction class tap made up of 9×9 pixels in the horizontal and vertical directions for a total of 81 pixels, with the corresponding pixel shown with a black dot in the center thereof.

Also, FIG. 8B shows a level limit class tap (predicted tap) made up of 13 pixels in a diamond shape, with the corresponding pixel shown with a black dot in the center thereof.

Further, FIG. 8C shows a waveform class tap made up of 9 pixels in a cross shape, with the corresponding pixel shown with a black dot in the center thereof.

Next, the peak level direction classifying processing performed by the peak level direction classifying unit 61 will be described with reference to FIG. 9. FIG. 9 shows an example of a histogram generated by the histogram generating unit 91 of the peak level direction classifying unit 61. In FIG. 9, the horizontal axis indicates the pixel value of the pixel, and the vertical axis indicates the number of pixels (number of times) corresponding to the pixel values in the horizontal axis.

The histogram generating unit 91 generates a histogram (FIG. 9) of a peak level direction class tap, based on the peak level direction class tap (FIG. 8A) from the peak level direction class tap extracting unit 31, and supplies this to the maximum value/minimum value obtaining unit 92.

The maximum value/minimum value obtaining unit 92 obtains the maximum pixel value Max and minimum pixel value Min from the histogram from the histogram generating unit 91, and supplies this to the segment dividing unit 93 along with a histogram from the histogram generating unit 91.

The segment dividing unit 93 divides the histogram from the maximum value/minimum value obtaining unit 92 into the two segments of segment 1 shown in Expression (2) and segment 2 shown in Expression (3), based on maximum pixel value Max and minimum pixel value Min from the maximum value/minimum value obtaining unit 92, and supplies this to the frequency detecting unit 94.

The frequency detecting unit 94 detects the number of pixels within segment 1 as $Freq_1$, and detects the number of pixels within segment 2 as $Freq_2$, based on the histogram divided into segment 1 and segment 2, and supplies this to the frequency comparing unit 95.

By comparing the frequency $Freq_n$ from the frequency detecting unit 94 and threshold $Freq_{th}$, the frequency comparing unit 95 determines whether or not Expression (4) is satisfied, and based on the determination results thereof, recognizes the peak level direction of the peak level direction class tap.

Also, the frequency comparing unit 95 classifies the pixel of interest into a class expressing the peak level direction recognized by the determination results out of the multiple peak level direction classes, based on the peak level direction recognized by the determination results, and outputs the peak level direction class code corresponding to the peak level direction class of the pixel of interest obtained by such classifying to the level limit classifying unit 62 and level component class identifying unit 63.

Next, the frequency comparing unit 95 which recognizes the peak level direction of the peak level direction class tap and outputs the peak level direction class code corresponding to the peak level direction class of the pixel of interest obtained from the peak level direction recognizes will be described with reference to FIGS. 10 and 11.

Figure 10A:
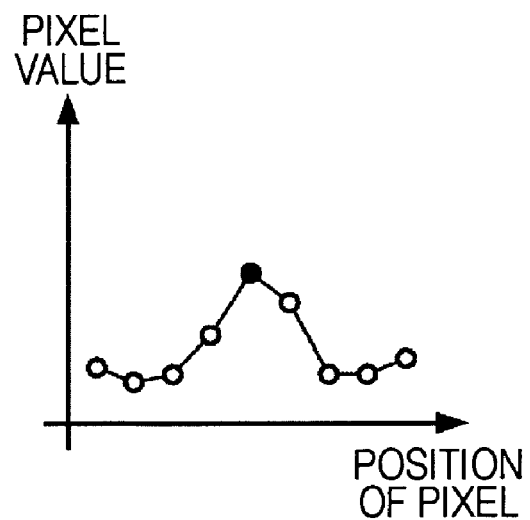
FIGS. 10A through 10C are diagrams illustrating an example of a peak level direction class tap waveform.
Figure 10B:
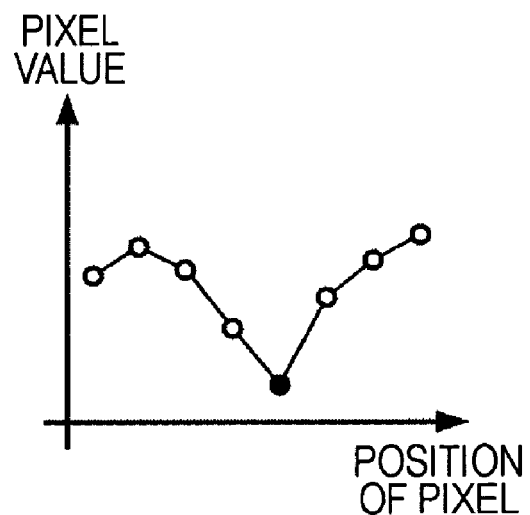
Figure 10C:
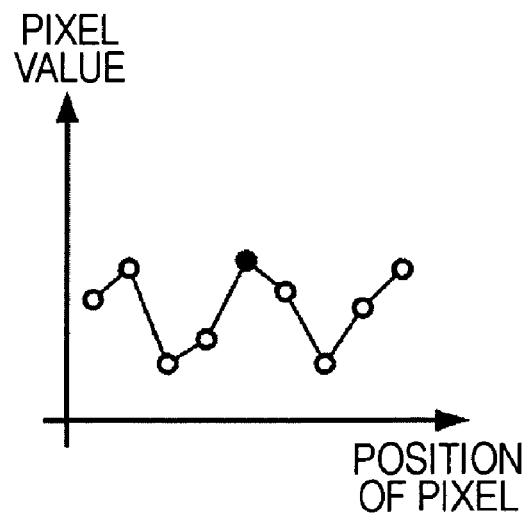

FIGS. 10A through 10C show an example of a waveform of a peak level direction class tap which has the peak level direction in the upward direction, downward direction, or both directions. In FIGS. 10A through 10C, the horizontal axis shows the position of pixels, and vertical axis shows the pixel value of the pixels.

FIG. 10A shows a waveform of a peak level direction class tap wherein the peak level direction is in the upward direction. A waveform of a peak level direction class tap wherein the peak level direction is in the upward direction is a waveform having a peaking form above a peak level (peak value) of the pixel values in the upward direction in FIG. 10A, and indicates a waveform wherein the pixel values of the multiple pixels making up the peak level direction class tap are pixel values skewed lower compared to the peak level shown in FIG. 10A.

Also, FIG. 10B shows a waveform of a peak level direction class tap wherein the peak level direction is in the downward direction. A waveform of a peak level direction class tap wherein the peak level direction is in the downward direction is a waveform having a peaking form above a peak level (peak value) of the pixel values in the downward direction in FIG. 10B, and indicates a waveform wherein the pixel values of the multiple pixels making up the peak level direction class tap are pixel values skewed higher compared to the peak level shown in FIG. 10B.

Further, FIG. 10C shows a waveform of a peak level direction class tap wherein the peak level direction is in both directions. A waveform of a peak level direction class tap wherein the peak level direction is in both directions is made up of a waveform with an upward peaking and a waveform with a downward peaking, and is a waveform having a peak level of pixel values for each of the upward direction and downward direction, and indicates a waveform wherein the pixel values of the multiple pixels making up the peak level direction class tap exist in low pixel values and high pixel values in roughly similar amounts.

FIG. 11 shows a peak level direction class code output from the frequency comparing unit 95. In FIG. 11, the first column from the left shows peak level direction class codes P1, P2, and P3 corresponding to the peak level direction class that the pixel of interest is classified into with the peak level direction classifying processing. In FIG. 11, the second column from the left shows the value 1 indicating that Expression (4) is true in the case that the frequency $Freq_1$ expressing the number of pixels within segment 1 satisfies Expression (4), and shows the value 0 indicating that Expression (4) is false in the case that the frequency $Freq_1$ expressing the number of pixels within segment 1 does not satisfy Expression (4).

Also, the third column from the left shows the value 1 indicating that Expression (4) is true in the case that the frequency $Freq_2$ expressing the number of pixels within segment 1 satisfies Expression (4), and shows the value 0 indicating that Expression (4) is false in the case that the frequency $Freq_2$ expressing the number of pixels within segment 1 does not satisfy Expression (4). Further, the fourth column from the left shows the peak level direction of the peak level direction class tap.

As shown in the second row in FIG. 11, in the case that Expression (4) regarding the frequency $Freq_1$ from the frequency detecting unit 94 is true (value 1), and the Expression (4) regarding the frequency $Freq_2$ from the frequency detecting unit 94 is false (value 0), the waveform of the peak level direction class tap has pixel values skewed towards lower pixel values as compared to the peak level, and becomes a waveform with the peak level direction in the upward direction.

In this case, the frequency comparing unit 95 classifies the pixel of interest into a peak level direction class which indicates that the peak level direction of the peak level direction class tap is in the upward direction, and supplies the peak level direction class code P1 corresponding to the peak level direction class thereof to the level limit classifying unit 62 and level component class identifying unit 63.

Also, as shown in the third row of in FIG. 11, in the case that Expression (4) regarding the frequency $Freq_1$ from the frequency detecting unit 94 is false (value 0), and the Expression (4) regarding the frequency $Freq_2$ from the frequency detecting unit 94 is true (value 1), the waveform of the peak level direction class tap has pixel values skewed towards higher pixel values as compared to the peak level, and becomes a waveform with the peak level direction in the downward direction.

In this case, the frequency comparing unit 95 classifies the pixel of interest into a peak level direction class which indicates that the peak level direction of the peak level direction class tap is in the downward direction, and supplies the peak level direction class code P2 corresponding to the peak level direction class thereof to the level limit classifying unit 62 and level component class identifying unit 63.

Also, as shown in the fourth row of in FIG. 11, in the case that Expression (4) regarding the frequency $Freq_1$ from the frequency detecting unit 94 and the Expression (4) regarding the frequency $Freq_2$ from the frequency detecting unit 94 are both true (value 1), the waveform of the peak level direction class tap has pixel values with low pixel values and high pixel values in roughly similar amounts, and the waveform has peak level directions in both directions.

In this case, the frequency comparing unit 95 classifies the pixel of interest into a peak level direction class which indicates that the peak level direction of the peak level direction class tap is in both directions, and supplies the peak level direction class code P3 corresponding to the peak level direction class thereof to the level limit classifying unit 62 and level component class identifying unit 63.

Figure 12:
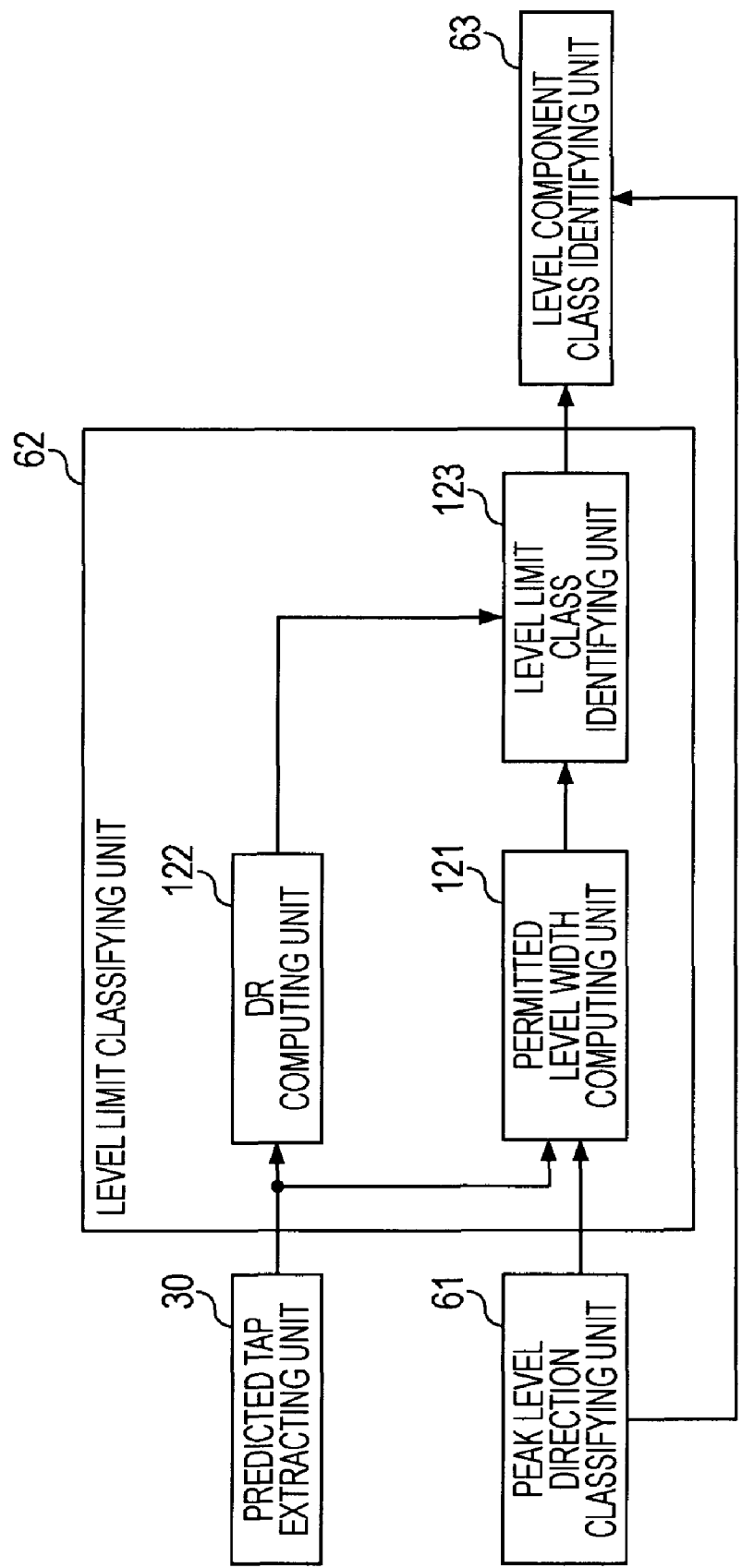
FIG. 12 is a block diagram illustrating a detailed configuration example of the level limit class classifying unit in FIG. 6.

Next, FIG. 12 shows a detailed configuration example of the level limit classifying unit 62 in FIG. 6. The level limit classifying unit 62 is made up of a permitted level width computing unit 121, DR computing unit 122, and level limit class identifying unit 123.

The level limit class tap from the predicted tap extracting unit 30 and the peak level direction class code corresponding to the peak level direction class of the pixel of interest from the peak level direction classifying unit 61 are supplied to the permitted level width computing unit 121.

The permitted level width computing unit 121 performs permitted level width computing processing to obtain the permitted level width LW of the pixel of interest, based on one of the maximum pixel value or minimum pixel value out of the pixel values of the multiple pixels making up the level limit class tap from the predicted tap extracting unit 30, and on the peak level direction shown by the peak level direction class code from the peak level direction classifying unit 61.

The permitted level width computing unit 121 supplies the permitted level width LW of the pixel of interest obtained by the permitted level width obtaining processing to the level limit class identifying unit 123. The level limit class tap is supplied to the DR computing unit 122 from the predicted tap extracting unit 30.

The DR computing unit 122 computes the dynamic range DR of the level limit class tap from the predicted tap extracting unit 30, and supplies this to the level limit class identifying unit 123.

The level limit class identifying unit 123 divides the permitted level width LW from the permitted level width computing unit 121 by the dynamic range DR of the level limit class tap from the DR computing unit 122, thereby computing a ratio (LW/DR) between the permitted level width LW and dynamic range DR.

Also, based on the ratio computed from the permitted level width LW and dynamic range DR, the level limit class identifying unit 123 identifies the level limit class corresponding to the ratio thereof as a level limit class of the pixel of interest from multiple level limit classes.

That is to say, for example, in the case of classifying the pixel of interest into one class of two classes which are a level limit class 1 and level limit class 2, the level limit class identifying unit 123 identifies the level limit class of the pixel of interest as the level limit class 1 when the ratio is at or above a threshold 0 and at or below a threshold value 0.5, and identifies the level limit class of the pixel of interest as the level limit class 2 when the ratio is above the threshold 0.5.

Note that the level limit class is not limited to the two classes of the level limit class 1 and level limit class 2, but the level limit class identifying unit 123 can identify the level limit class of the pixel of interest from three or more level limit classes, according to the manner of threshold setting.

The level limit class identifying unit 123 outputs the level limit class code corresponding to the level limit class of the pixel of interest to the level component class identifying unit 63.

Next, the permitted level width obtaining processing performed by the permitted level width computing unit 121 will be described in detail with reference to FIGS. 13 and 14. Note that with the permitted level width obtaining processing, the permitted level width LW is obtained with various differing obtaining methods according to the respective peak level direction class codes.

Figure 13:
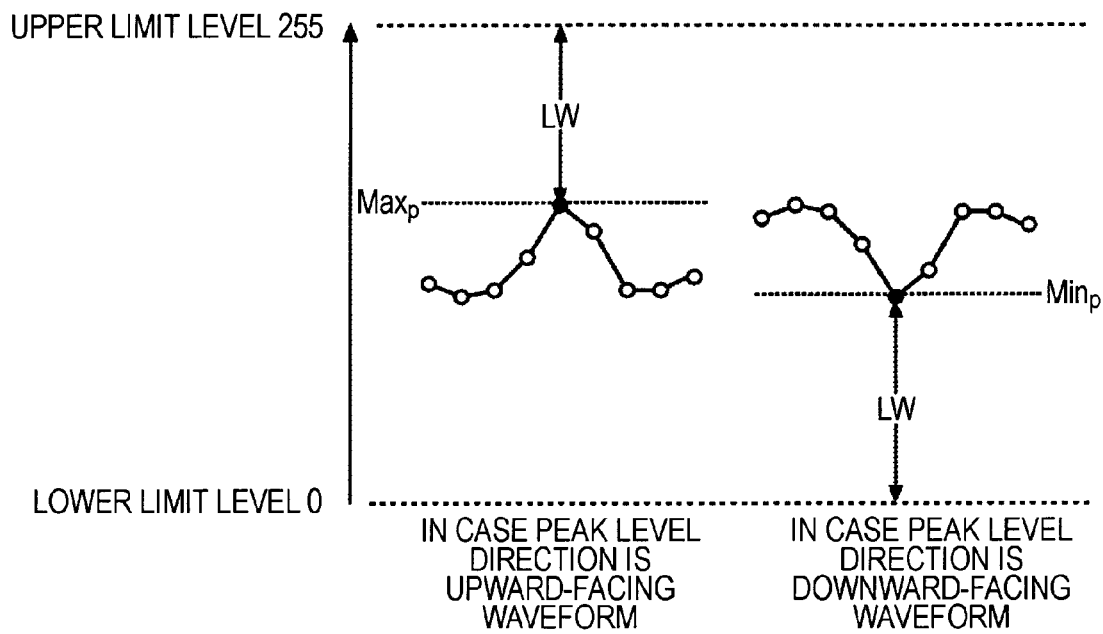
FIG. 13 is a first diagram illustrating an obtaining method to obtain the permitted level width LW.

FIG. 13 is a diagram describing an obtaining method to obtain the permitted level width LW in the case that the peak level direction class code is shown as the upward direction or downward direction as a peak level direction of the peak level direction class tap. In FIG. 13, the vertical axis indicates the pixel values of the pixels. Note that the same holds true in FIG. 14 also. Also, the left side of FIG. 13 shows a waveform of a peak level direction class tap wherein the peak level direction is the upward direction. Further, the right side of FIG. 13 shows a waveform of a peak level direction class tap wherein the peak level direction is the downward direction.

Note that the waveform of the peak level direction class tap shown on the left side and right side of FIG. 13 shows a waveform of a peak level direction class tap make up of 9 pixels lined up in the horizontal direction, with the corresponding pixel (shown in black) as the center thereof. Also, the peak level direction class tap is configured so as to include the level limit class tap, and the level limit class tap is made up of the corresponding pixel and two pixels adjacent to the corresponding pixel thereof in the horizontal direction for a total of 3 pixels. Note that the same holds true in FIG. 14 also.

In the case that the peak level direction class code from the peak level direction classifying unit 61 is shown as the upward direction as the peak level direction of the peak level direction class tap, as shown on the left side of FIG. 13, the permitted level width computing unit 121 subtracts the maximum value $Max_p$ out of the pixel values of the corresponding pixel and the two pixels adjacent to the corresponding pixel in the horizontal direction for a total of 3 pixels, which make up the level limit class tap, from the upper limit level (value 255), and computes the permitted level width LW (255−$Max_p$).

In the case that (the peak level direction class tap which includes) the waveform of the level limit class tap is a waveform with an upward peaking form, the predicted value of the pixel of interest becomes a value greater than each of the multiple pixels making up the level limit class tap. Accordingly, in the case that the pixel values of the multiple pixels making up the level limit class tap exists near the upper limit level 255, the predicted value of the pixel of interest has a tendency to rise above the upper limit level 255.

When rising above the upper limit level 255, the predicted value of the pixel of interest is replaced with the upper limit level 255. Accordingly, in this case, the range wherein the predicted value of the pixel of interest is permitted as the true value becomes a range at or above the pixel value (pixel value $Max_p$) for each of the multiple pixels making up the level limit class tap, and at or below the upper limit level 255. The width of this range is set as the permitted level width LW.

Also, in the case that the peak level direction class code from the peak level direction classifying unit 61 is shown as the downward direction as the peak level direction of the peak level direction class tap, as shown on the right side of FIG. 13, the permitted level width computing unit 121 uses the minimum pixel value Minp (MinP−0) without change as the permitted level width LW, out of the pixel values of the corresponding pixel and the two pixels adjacent to the corresponding pixel in the horizontal direction for a total of 3 pixels, which make up the level limit class tap.

In the case that the waveform of the level limit class tap is a waveform with a downward peaking form, the predicted value of the pixel of interest becomes a value smaller than each of the multiple pixels making up the level limit class tap. Accordingly, in the case that the pixel values of the multiple pixels making up the level limit class tap exists near the lower limit level 0, the predicted value of the pixel of interest has a tendency to fall below the lower limit level 0.

When falling below the lower limit level 0, the predicted value of the pixel of interest is replaced with the lower limit level 0.

Accordingly, in this case, the range wherein the predicted value of the pixel of interest is permitted as the true value becomes a range at or below the pixel value (pixel value $Min_p$) for each of the multiple pixels making up the level limit class tap, and at or above the lower limit level 0. The width of this range is set as the permitted level width LW.

Figure 14:
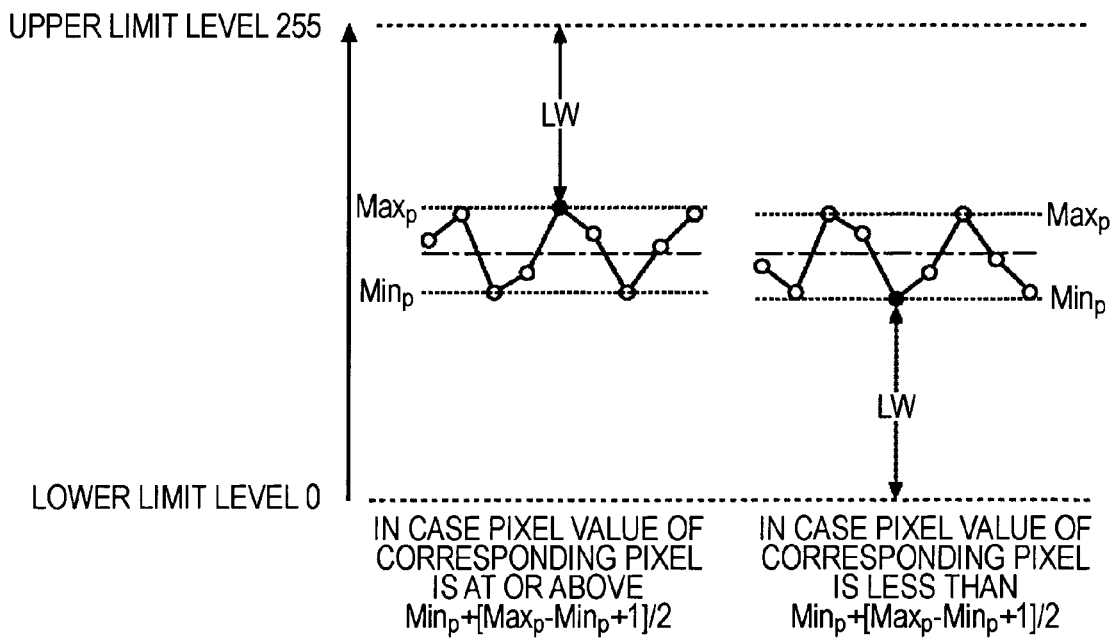
FIG. 14 is a second diagram illustrating an obtaining method to obtain the permitted level width LW.

FIG. 14 is a diagram describing an obtaining method to obtain the permitted level width LW in the case that the peak level direction class code shows both directions as the peak level direction of the peak level direction class tap. The left side and right side of FIG. 14 show a waveform of the peak level direction class tap wherein the peak level direction is both directions.

Also, the pixel value of the corresponding pixels of the peak level direction class tap shown on the left side of FIG. 14 is at or above $Min_p+[Max_p-Min_p+1]/2$, and the pixel value of the corresponding pixels of the peak level direction class tap shown on the right side of FIG. 14 is less than $Min_p+[Max_p-Min_p+1]/2$.

In the case that the peak level direction class code from the peak level direction classifying unit 61 shows both directions to be the peak level direction of the peak level direction class tap, the permitted level width computing unit 121 determines whether or not the pixel value of the corresponding pixel is at or above $Min_p+[Max_p-Min_p+1]/2$, and based on the determination results thereof, computes the permitted level width LW.

That is to say, for example, if the pixel value of the corresponding pixel is determined to be at or above $Min_p+[Max_p-Min_p+1]/2$, as shown in the left side of FIG. 14, the permitted level width computing unit 121 subtracts the maximum value $Max_p$ out of the pixel values of the corresponding pixel and the two pixels adjacent to the corresponding pixel in the horizontal direction for a total of 3 pixels, which make up the level limit class tap, from the upper limit level, and computes the permitted level width LW (255−$Max_p$).

Also, for example, if the pixel value of the corresponding pixel is determined to be below $Min_p+[Max_p-Min_p+1]/2$, as shown in the right side of FIG. 14, the permitted level width computing unit 121 uses the minimum pixel value Minp without change as the permitted level width LW, out of the pixel values of the corresponding pixel and the two pixels adjacent to the corresponding pixel in the horizontal direction for a total of 3 pixels, which make up the level limit class tap.

The permitted level width computing unit 121 supplies the permitted level width LW obtained with the permitted level width obtaining processing to the level limit class identifying unit 123.

The level limit class identifying unit 123 divides the permitted level width LW from the permitted level width computing unit 121 by the dynamic range DR of the level limit class tap from the DR computing unit 122, thereby computing a ratio (LW/DR) between the permitted level width LW and dynamic range DR.

Next, an example of a ratio computed with the level limit class identifying unit 123 in FIG. 12 will be described with reference to FIG. 15. Waveform A (left side in FIG. 15), waveform B (center in FIG. 15), and waveform C (right side in FIG. 15) are each waveforms of a level limit class tap made up of nine pixels lined up in a horizontal direction with a corresponding pixel (shown with a black dot) and are waveforms having an upward peaking form.

Figure 15:
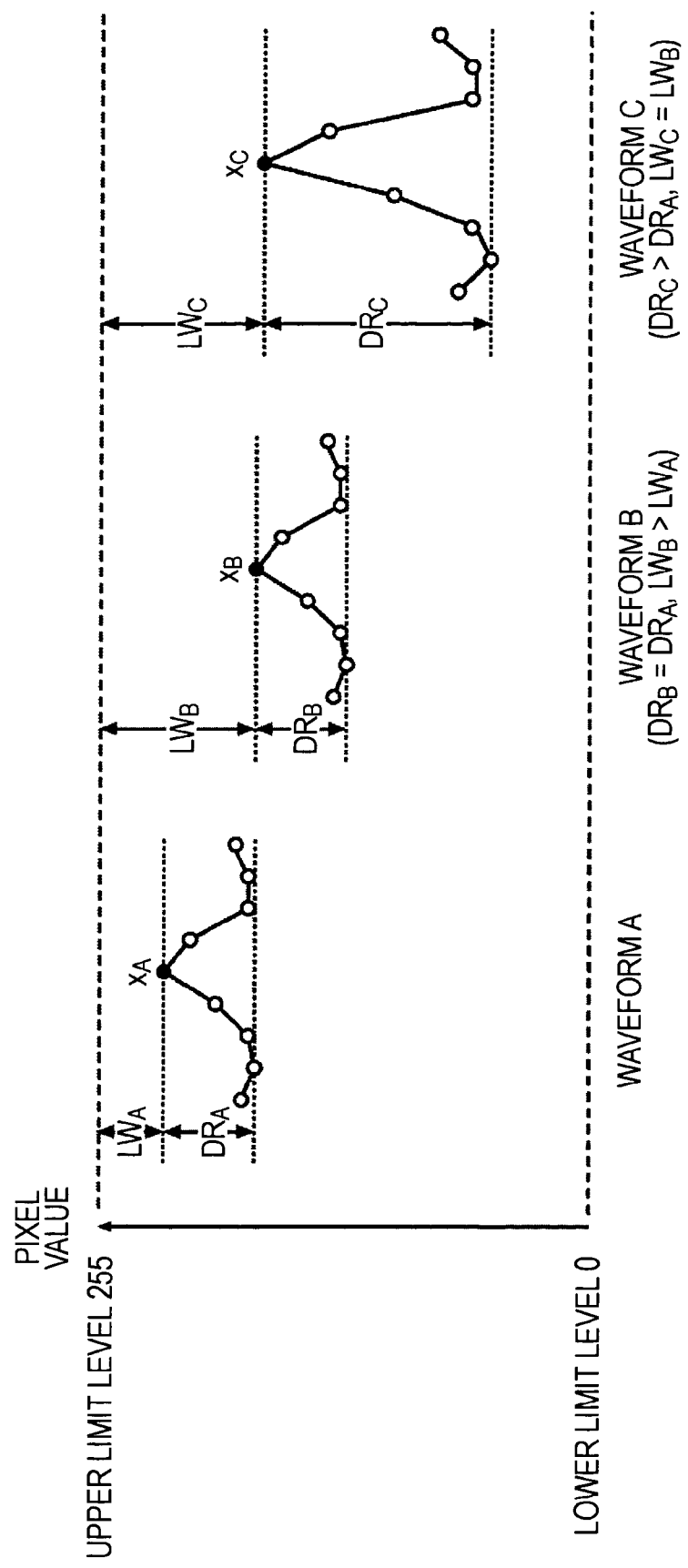
FIG. 15 is a diagram illustrating a ratio computed by the level limit class identifying unit in FIG. 12.

Note that in FIGS. 13 and 14, the level limit class tap is made up of the corresponding pixel and the two pixels adjacent in the horizontal direction to the corresponding pixel for a total of 3 pixels, but in FIG. 15, the level limit class tap is described as being made up of 9 pixels lined up in the horizontal direction.

The pixel value of a corresponding pixel $X_A$ having the maximum pixel value in waveform A is greater than the pixel value of a corresponding pixel $X_B$ having the maximum pixel value in waveform B, whereby the permitted level width $LW_A$ of waveform A is narrower than the permitted level width $LW_B$ of waveform B. Also, the pixel value of a corresponding pixel $X_B$ having the maximum pixel value in waveform B is the same value as the pixel value of a corresponding pixel $X_C$ having the maximum pixel value in waveform C, whereby the permitted level width $LW_B$ of waveform B and the permitted level width $LW_C$ of waveform C are the same width.

The dynamic range $DR_A$ of waveform A and the dynamic range $DR_B$ of waveform B are the same value, and the dynamic range $DR_C$ of waveform C is a greater value than the dynamic range $DR_A$ of waveform A.

As described above, the permitted level width $LW_A$ of waveform A is narrower than the permitted level width $LW_B$ of waveform B, and the dynamic range $DR_A$ of waveform A and the dynamic range $DR_B$ of waveform B are the same value, so the ratio $(LW_A/DR_A)$ in waveform A is smaller than the ratio $(LW_B/DR_B)$ in waveform B.

Also, as described above, the permitted level width $LW_B$ of waveform B and the permitted level width $LW_C$ of waveform C are the same width, and the dynamic range $DR_B$ of waveform B is smaller than the dynamic range $DR_C$, so the ratio $(LW_B/DR_B)$ in waveform B is greater than the ratio $(LW_C/DR_C)$ in waveform C.

The narrower that the permitted level width LW is, and the greater that the dynamic range DR is, the predicted value of the pixel of interest has a tendency to rise above the upper limit level 255.

Accordingly, in order for the predicted value of the pixel of interest to rise above the upper limit level or fall below the lower limit level, the level limit class identifying unit 123 identifies the level limit class corresponding to the ratio, (LW/DR) computed from the permitted level width LW and dynamic range DR from multiple level limit classes, as the level limit class of the pixel of interest.

Next, the image conversion processing performed by the image processing device 1 in FIG. 5 will be described with reference to the flowchart in FIG. 16.

In step S1, the predicted tap extracting unit 30 causes the pixels making up the second image data which are the conversion results of the first image data to be the pixel of interest in sequence, for example in raster scan order.

Also, in step S1, the predicted tap extracting unit 30 extracts multiple pixels existing in the periphery of the corresponding pixel, including the corresponding pixel of the first image data which corresponds to the pixel of interest, as a predicted tap for use with prediction calculation to predict the pixel of interest, from the supplied first image data, and supplies this to the prediction computing unit 36.

Further, in step S1, the predicted tap extracting unit 30 supplies the predicted tap extracted from the first image data to the level component classifying unit 33, as a level limit class tap for using with the level limit classifying processing included in the level component classifying processing which classifies the pixel of interest into one of multiple level component classes.

In step S2, the peak level direction class tap extracting unit 31 extracts the multiple pixels existing in the periphery of the corresponding pixel, including the corresponding pixel, to the level component classifying unit 33, as a peak level direction class tap for use with the peak level direction classifying processing included in the level component classifying processing which classifies the pixel of interest into one of multiple level component classes.

In step S3, the waveform class tap extracting unit 32 extracts the multiple pixels existing in the periphery of the corresponding pixel, including the corresponding pixel, to the waveform pattern classifying unit 34, as a waveform class tap for use with the waveform pattern classifying processing which classifies the pixel of interest into one of multiple waveform pattern classes.

In step S4, the level component classifying unit 33 performs level component classifying processing to classify the pixel of interest into one of multiple level component classes, based on the level limit class tap from the predicted tap extracting unit 30 and the peak level direction class tap from the peak level direction class tap extracting unit 31, and supplies the level component class code corresponding to the level component class of the pixel of interest as obtained from the results thereof to the coefficient ROM 35.

In step S5, the waveform pattern classifying unit 34 performs waveform pattern classifying processing to classify the pixel of interest into a class expressing features of the waveform of the waveform class tap from the waveform class tap extracting unit 32 out of multiple wave pattern classes, based on the waveform class tap from the waveform class tap extracting unit 32, and supplies the waveform pattern class code corresponding to the waveform pattern class of the pixel of interest as obtained from the results thereof to the coefficient ROM 35.

In step S6, the coefficient ROM 35 outputs the predicted coefficient stored in the address corresponding to a combination of a level component class code from the level component classifying unit 33 and a waveform pattern class code from the waveform pattern classifying unit 34 (prediction coefficient corresponding to a combination of a level component class expressed by the level component class code from the level component classifying unit 33 and a waveform pattern class expressed by the waveform pattern class code from the waveform pattern classifying unit 34), out of a set of stored prediction coefficients, to the prediction computing unit 36.

In step S7, the prediction computing unit 36 uses the multiple pixels making up the predicted tap from the predicted tap extracting unit 30 and the prediction coefficient output by the coefficient ROM 35, to perform predetermined prediction computing to predict the pixel of interest.

Figure 16:
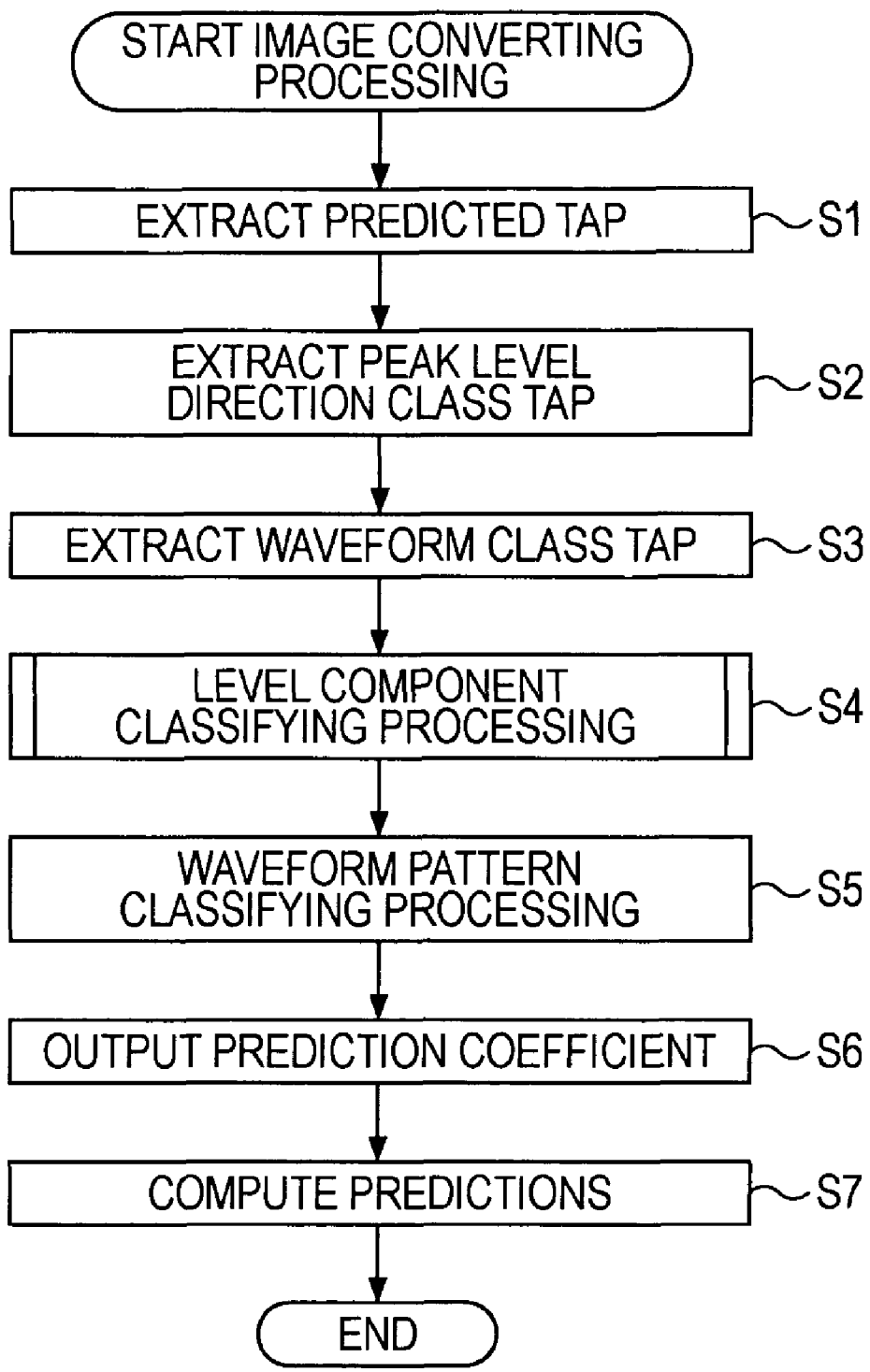
FIG. 16 is a flowchart describing image conversion processing.

Thus, upon converting the first image data input in the image processing device 1 to second image data by causing all of the pixels making up the second image data to be a pixel of interest, the image conversion processing in FIG. 16 is ended.

Next, details of the level component classifying processing in step S4 in FIG. 16 will be described with reference to the flowchart in FIG. 17.

In step S31, the peak level direction classifying unit 61 performs peak level direction classifying processing to classify the pixel of interest into a class expressing the peak level direction of the peak level direction class tap from the peak level direction class tap extracting unit 31 out of the multiple peak level direction classes, based on the histogram of the pixel values of the multiple pixels making up the peak level direction class tap from the peak level direction class tap extracting unit 31, and supplies the peak level direction class code corresponding to the peak level direction class of the pixel of interest obtained as a result thereof to the level limit classifying unit 62 and level component class identifying unit 63.

In step S32, the level limit classifying unit 62 performs level limit classifying processing to classify the pixel of interest into a class corresponding to the ratio between permitted level width LW and dynamic range DR out of multiple level limit classes, based on the peak level direction expressed by the peak level direction class code from the peak level direction classifying unit 61 and the ratio between the permitted level width LW obtained according to the level limit class tap from the predicted tap extracting unit 30 and the dynamic range DR of the level limit class tap from the predicted tap extracting unit 30, and supplies the level limit class code corresponding to the level limit class of the pixel of interest obtained as a result thereof to the level component class identifying unit 63.

In step S33, the level component class identifying unit 63 identifies the level component class of the pixel of interest from multiple level component classes, based on the combination of peak level direction class code from the peak level direction classifying unit 61 and level limit class code from the level limit classifying unit 62.

Figure 17:
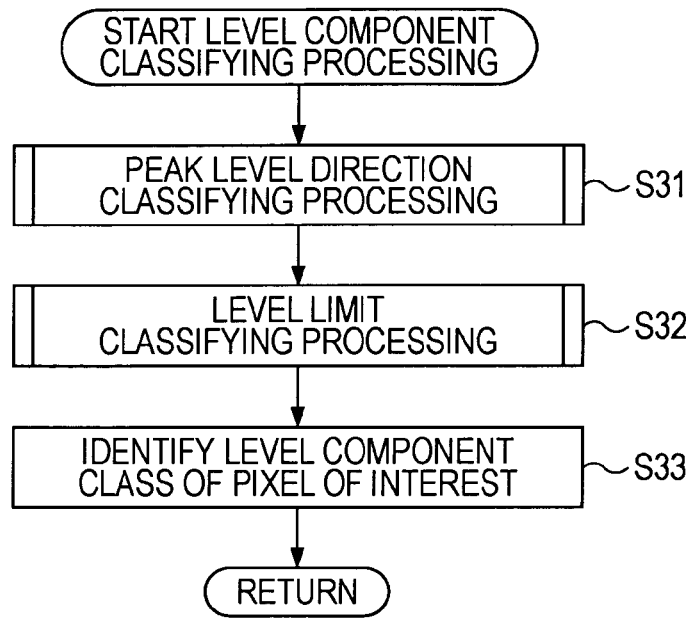
FIG. 17 is a flowchart describing details of level component class classifying processing.

Upon the level component classifying processing in FIG. 17 being thus performed, the level component class identifying unit 63 outputs the level component class code corresponding to the level component class of the identified pixel of interest to the coefficient ROM 35, and the processing is returned to step S4 in FIG. 16.

Next, details of the peak level direction classifying processing in step S31 in FIG. 17 will be described with reference to the flowchart in FIG. 18.

In step S61, the histogram generating unit 91 generates a histogram of the pixel values of the multiple pixels making up the peak level direction class tap from the peak level direction class tap extracting unit 31, and supplies this to the maximum value/minimum value obtaining unit 92.

In step S62, the maximum value/minimum value obtaining unit 92 obtains (detects) the maximum pixel value Max and the minimum pixel value Min of the pixel values multiple pixels making up the peak level direction class tap, based on the histogram of the peak level direction class tap from the histogram generating unit 91, and supplies this to the segment dividing unit 93, along with the histogram from the histogram generating unit 91.

In step S63, the segment dividing unit 93 computes the segment width "step" by using Expression (1) as to the maximum pixel value Max and minimum pixel value Min from the maximum value/minimum value obtaining unit 92, divides the histogram from the maximum value/minimum value obtaining unit 92 into two segments of the segment 1 in Expression (2) and segment 2 in Expression (3), and supplies this to the frequency detecting unit 94.

In step S64, based, on the histogram divided into segment 1 and segment 2 from the segment dividing unit 93, the frequency detecting unit 94 detects the number of pixels within segment 1 as frequency $Freq_1$, and detects the number of pixels within segment 2 as frequency $Freq_2$, and supplies this to the frequency comparing unit 95.

In step S65, the frequency comparing unit 95 compares the frequency $Freq_n$ from the frequency detecting unit 94 and the threshold $Freq_{th}$, thereby determining whether or not Expression (4) is satisfied, and based on the determination results thereof, recognizes the peak level direction of the peak level direction class tap.

Also, in step S65, the frequency comparing unit 95 classifies the pixel of interest into one of multiple peak level direction classes, based on the peak level direction of the peak level direction class tap recognized by the determination results.

Figure 18:
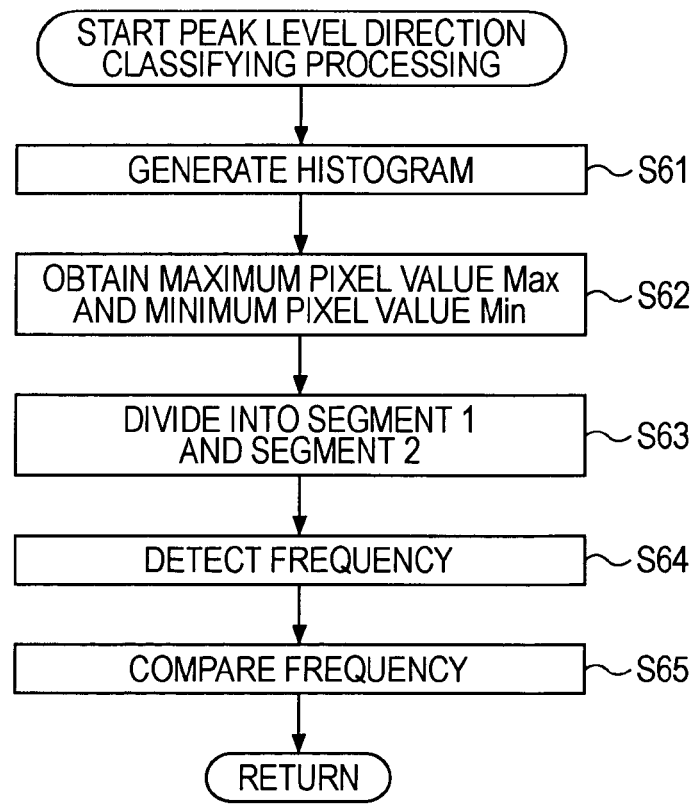
FIG. 18 is a flowchart describing details of peak level direction class classifying processing.

Upon the peak level direction classifying processing in FIG. 18 being thus performed, the frequency comparing unit 95 supplies the peak level direction class code corresponding to the peak level direction class of the pixel of interest obtained as a result of the peak level direction classifying processing in FIG. 18 to the level limit classifying unit 62 and level component class identifying unit 63, and the processing is returned to step S31 in FIG. 17.

Next, details of the level limit classifying processing in step S32 in FIG. 17 will be described with reference to the flowchart in FIG. 19.

In step S91, the permitted level width computing unit 121 performs permitted level width obtaining processing to compute the permitted level width LW of the pixel of interest, based on one of the maximum pixel value or minimum pixel value of the pixel values of the multiple pixels making up the level limit class tap from the predicted tap extracting unit 30, and on the peak level direction expressed by the peak level direction class code from the peak level direction classifying unit 61, and supplies the permitted level width LW obtained as a result thereof to the level limit class identifying unit 123.

In step S92, the DR computing unit 122 computes the dynamic range DR of the level limit class tap from the predicted tap extracting unit 30, and supplies this to the level limit class identifying unit 123.

In step S93, the level limit class identifying unit 123 computes the ratio between the permitted level width LW and dynamic range DR (LW/DR) by dividing the permitted level width LW from the permitted level width computing unit 121 by the dynamic range DR of the level limit class tap from the DR computing unit, and identifies the level limit class corresponding to the ratio thereof as the level limit class of the pixel of interest from the multiple level limit classes.

Figure 19:
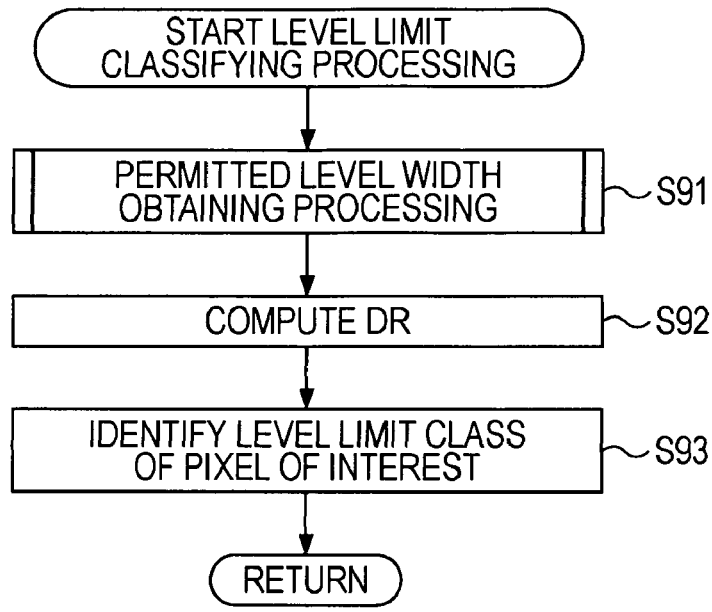
FIG. 19 is a flowchart describing details of level limit class classifying processing.

Upon the level limit classifying processing in FIG. 19 being thus performed, the level limit class identifying unit 123 outputs the level limit class code corresponding to the identified level limit class of the pixel of interest to the level component class identifying unit 63, and the processing is returned to step S32 in FIG. 17.

Next, details of the permitted level width obtaining processing in step S91 in FIG. 19 will be described with reference to the flowchart in FIG. 20.

In step S121, the permitted level width computing unit 121 determines which of the upward direction, downward direction, or both directions the peak level direction class code from the peak level direction classifying unit 61 shows as a peak level direction of the peak level direction class tap output by the peak level direction class tap extracting unit 31.

In step S121, in the case determination is made that the peak level direction class code shows the upward direction as the peak level direction of the peak level direction class tap, the processing is advanced to step S122, and the permitted level width computing unit 121 subtracts the maximum pixel value $Max_p$ out of the pixel values of the multiple pixels making up the level limit class tap, from the upper limit level (value 255), computes the permitted level width LW (255−$Max_p$), and the permitted level width obtaining processing is ended.

In step S121, in the case determination is made that the peak level direction class code shows the downward direction as the peak level direction of the peak level direction class tap, the processing is advanced to step S124, and the permitted level width computing unit 121 uses without change the minimum pixel value $Min_p$ out of the pixel values of the multiple pixels making up the level limit class tap, as the permitted level width LW, and the permitted level width obtaining processing is ended.

Further, in step S121, in the case determination is made that the peak level direction class code shows both directions as the peak level direction of the peak level direction class tap, the processing is advanced to step S123, and the permitted level width computing unit 121 determines whether or not the pixel value of the corresponding pixel is at or above $Min_p +[Max_p-Min_p+1]/2$.

In the case determination is made in step S123 that the pixel value of the corresponding pixel is at or above $Min_p+[Max_p-Min_p+1]/2$, the processing is advanced to step S122, and similar to the case wherein the peak level direction class code shows the upward direction, the permitted level width computing unit 121 subtracts the maximum pixel value $Max_p$ out of the pixel values of the multiple pixels making up the level limit class tap, from the upper limit level (value 255), and computes the permitted level width LW ($255-Max_p$).

Also, in the case determination is made in step S123 that the pixel value of the corresponding pixel is not at or above $Min_p+[Max_p-Min_p+1]/2$, the processing is advanced to step S124, and similar to the case wherein the peak level direction class code shows the downward direction, the permitted level width computing unit 121 uses the pixel value $Min_p$ without change as the permitted level width LW.

Figure 20:
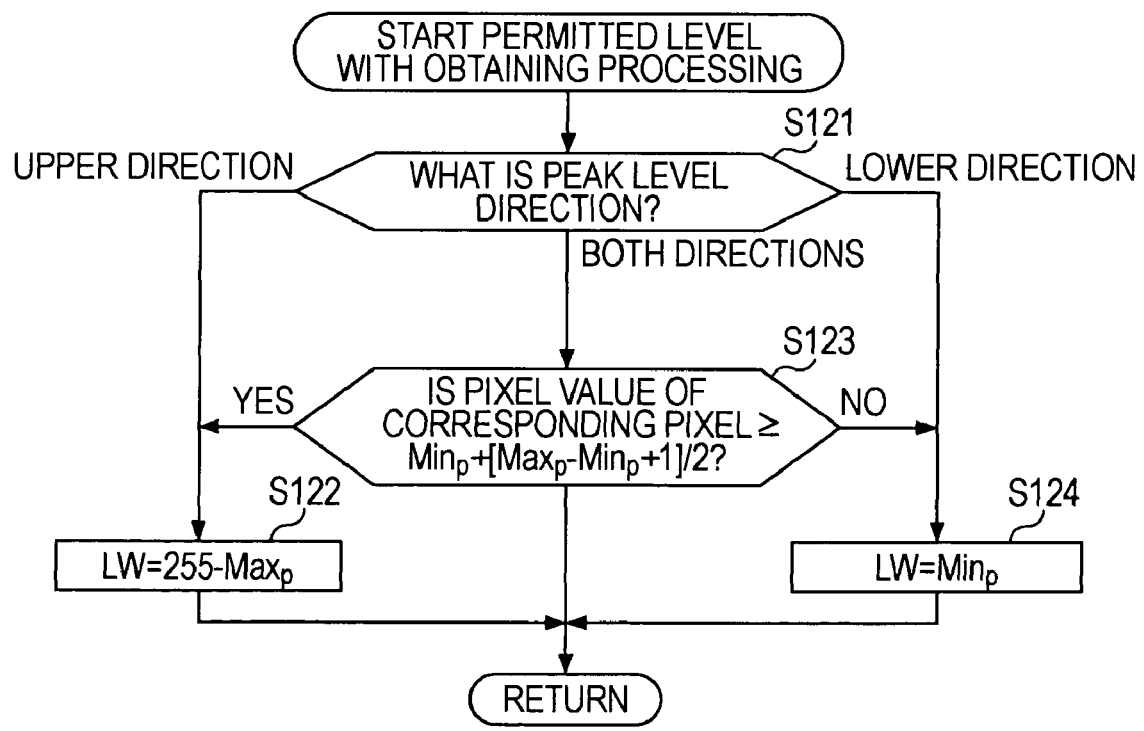
FIG. 20 is a flowchart describing details of permitted level width obtaining processing.

Upon the permitted level width processing in FIG. 20 being thus performed, the processing is returned to step S91 in FIG. 19.

As described above, the level limit class of the pixel of interest is identified based on the ratio between the permitted level width LW and the dynamic range DR of the level limit class tap (LW/DR) with the level limit classifying processing in FIG. 19.

Also, the level component class of the pixel of interest is identified based on the level limit class of the pixel of interest with the level component classifying processing in FIG. 17.

Accordingly, with the level component classifying processing in FIG. 17, the ratio between the permitted level width LW and the dynamic range DR of the level limit class tap is used to classify the pixel of interest into one class out of multiple level component classes.

Further, the narrower that the permitted level width LW is, and the greater that the dynamic range DR is, the predicted value of the pixel of interest has a tendency to rise above the upper limit level or fall below the lower limit level.

Thus, with the image conversion processing (including level component classifying processing) in FIG. 16, the pixel of interest is classified with consideration for the permitted level width LW and the dynamic range DR of the level limit class tap. Thus, compared to classification adaptive processing according to related art, the predicted value of the pixel of interest is suppressed from rising above the upper limit level or falling below the lower limit level, whereby a high quality image can be predicted.

The prediction computing with the prediction computing unit 36 in FIG. 5 and learning of the prediction coefficient stored in the coefficient ROM 35 will be described.

As described above, as image conversion processing, for example, let us say that the image data with high resolution (high resolution image data) is the second image data, and image data with low resolution wherein the high resolution image data thereof is subjected to sub-sampling and so forth (low resolution image data), and a predicted tap is extracted from such low resolution image data, obtaining (predicting) a pixel value of a pixel of the high resolution image data (hereafter referred to as "high resolution pixel") using the predicted tap thereof and prediction coefficient, by a predetermined prediction computing.

As the predetermined prediction computing, for example is we employ a linear computation, the pixel value y of the high resolution pixel can be found by the linear equation in the following Expression (5)

$$y = \sum_{n=1}^{N} W_n X_n \quad (5)$$

where $x_n$ represents a pixel value of the n'th pixel in the low resolution image data which makes up the predicted tap for the high resolution pixel y (hereafter referred to as "low resolution pixel", as appropriate), and $w_n$ represents the n'th prediction coefficient which is multiplied by (the pixel value of) the n'th low resolution pixel. Note that in Expression (5), the predicted tap is made up of N low resolution pixels $x_1, x_2, \ldots, x_n$.

The pixel value y of the high resolution pixel can also be obtained with a high order expression of a quadratic expression or higher, rather than with the linear primary expression shown in Expression (5).

If the true value of the pixel value of the k'th sample high resolution pixel is expressed as $y_k$, and the prediction value of the true value $y_k$ obtained with Expression (5) is expressed as $y_k'$, the predicted error $e_k$ thereof is expressed in the following Expression (6).

$$e_k = y_k - y_k' \quad (6)$$

Now, the predicted value yk' in Expression (6) is obtained according to Expression (5), whereby, if the yk' in Expression (6) is replaced according to Expression (5), the following expression (7) is obtained $$e_k = y_k - \left( \sum_{n=1}^{N} W_n X_{n,k} \right) \quad (7)$$

where $x_{n,k}$ expresses the n'th low resolution pixel making up the predicted tap for the k'th sample high resolution pixel.

The prediction coefficient $w_n$ wherein the predicted error $e_k$ in Expression (7) (or Expression (6)) is optimal for predicting the high resolution pixel, but obtaining such a prediction coefficient $w_n$ for all of the high resolution pixels is generally difficult.

Employing the least-squares method as a standard indicating that the prediction coefficient $w_n$ is optimal, for example, enables the optimal predicted coefficient $w_n$ to be obtained by minimizing the summation E of the square error expressed with the following Expression (8)

$$E = \sum_{k=1}^{K} e_k^2 \quad (8)$$

where K represents a sample number (sample number for learning) of a set of the high resolution pixel $y_k$ and the low resolution pixels $x_{1,k}, x_{2,k}, \ldots, x_{N,k}$ that make up the predicted tap for the high resolution pixel $y_k$.

The minimum value (minimum) of the summation E of the square error in Expression (8) is found with $w_n$, wherein the summation E having been partially differentiated with the prediction coefficient $w_n$ is 0, as shown in the following Expression (9).

$$\frac{\partial E}{\partial w_n} = e_1 \frac{\partial e_1}{\partial w_n} + e_2 \frac{\partial e_2}{\partial w_n} + \ldots + e_K \frac{\partial e_K}{\partial w_n} = 0 \quad (9)$$

$$(n = 1, 2, \ldots N)$$

On the other hand, if the above-described Expression (7) is partially differentiated with the predicted coefficient $w_n$, the following Expression (10) is obtained.

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, \quad (10)$$

$$(k = 1, 2, \ldots K)$$

The following Expression (11) can be obtained from Expression (9) and Expression (10).

$$\sum_{k=1}^{K} e_k x_{1,k} = 0, \sum_{k=1}^{K} e_k x_{2,k} = 0, \ldots, \sum_{k=1}^{K} e_k x_{N,k} = 0 \quad (11)$$

By substituting Expression (7) into the $e_k$ in Expression (11), Expression (11) can be expressed with the normal equation shown in the following Expression (12).

$$\begin{bmatrix} \left(\sum_{k=1}^{K} x_{1,k} x_{1,k}\right) & \left(\sum_{k=1}^{K} x_{1,k} x_{2,k}\right) & \cdots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \cdots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \cdots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \quad (12)$$

The normal equation in Expression (12) can be solved for the predicted coefficient $w_n$, by using an elimination method (Gauss-Jordan elimination method), for example.

By setting up and solving a normal equation of Expression (12) for each (combination of) waveform pattern class and level component class, the optimal prediction coefficient (here, the prediction coefficient which minimizes the summation E of the square error) $w_n$ can be found for each waveform pattern class and level component class (each multiple combination of waveform pattern class and level component class).

With the image processing device 1 in FIG. 5, by using such a prediction coefficient for every waveform pattern class and level component class to perform the computations in Expression (5), the low resolution image data serving as the first image data is converted to the high resolution image data serving as the second image data.

Figure 21:
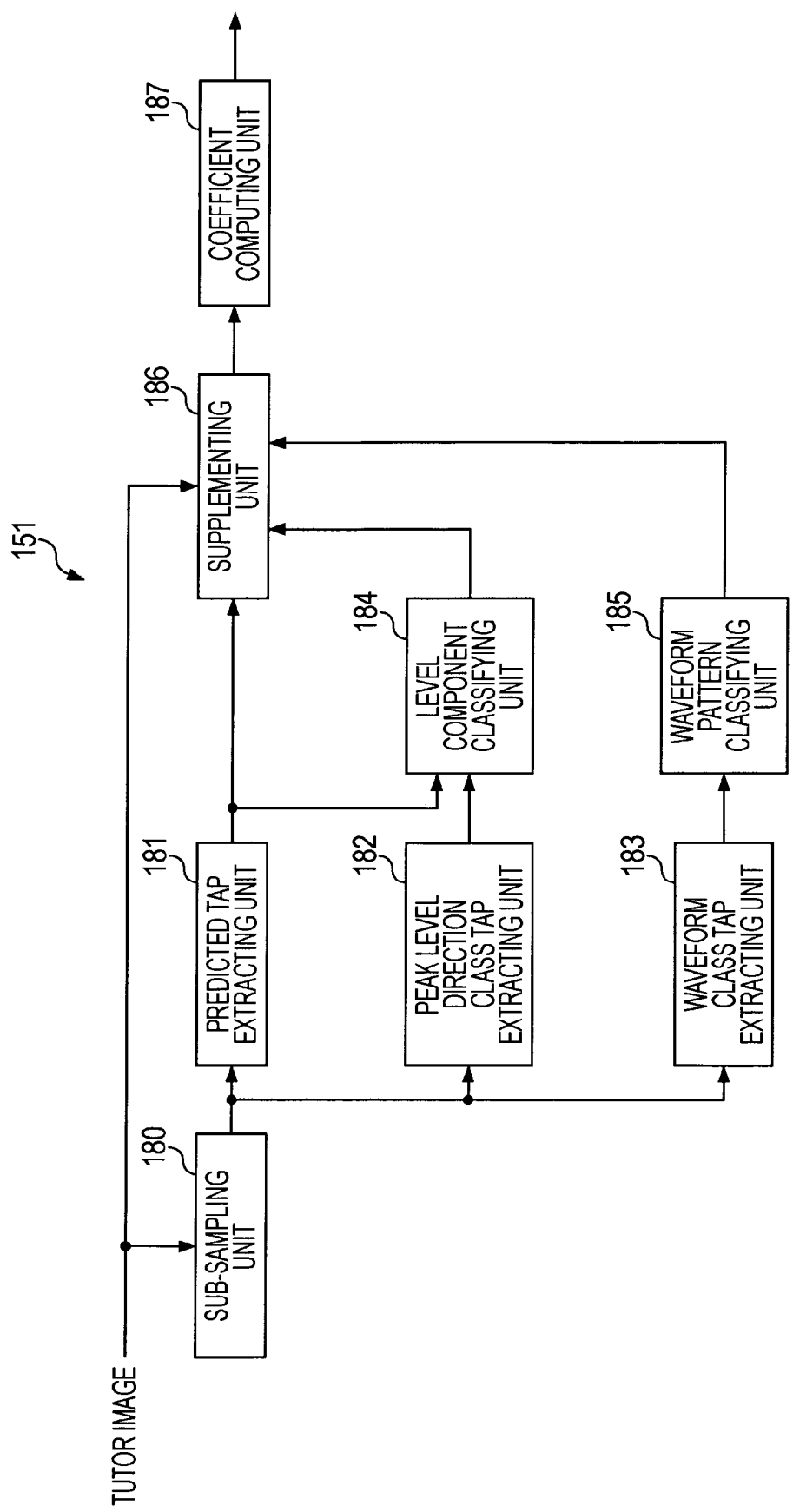
FIG. 21 is a block diagram illustrating a configuration example of a learning device.

Next, FIG. 21 shows a configuration example of a learning device to perform learning to find the prediction coefficient $w_n$ by setting up and solving the normal equation of Expression (12) for each waveform pattern class and level component class.

The learning device 151 in FIG. 21 is made up of a sub-sampling unit 180, predicted tap extracting unit 181, peak level direction class tap extracting unit 182, waveform class tap extracting unit 183, level component classifying unit 184, waveform pattern classifying unit 185, supplementing unit 186, and coefficient computing unit 187.

An image (second image data for learning) equating to the high resolution image data is supplied to the sub-sampling unit 180. Hereafter, the second image data for learning will also be referred to as a "tutor image".

The sub-sampling unit 180 subjects the tutor image supplied thereto to sub-sampling, and lowers the resolution thereof, thereby generating an image (first image data for learning) equating to the low resolution image data. Hereafter, the first image data for learning will also be referred to as a "student image".

The sub-sampling unit 180 supplies the student image obtained by subjecting the tutor image to sub-sampling to the predicted tap extracting unit 181, peak level direction class tap extracting unit 182, and waveform class tap extracting unit 183.

The predicted tap extracting unit 181 takes the pixels making up the tutor image as pixels of interest, sequentially, for example in raster scan order. Further, the predicted tap extracting unit 181 extracts predetermined pixels from the pixels making up the student image from the sub-sampling unit 180, thereby obtaining a predicted tap with a tap configuration that is the same as the predicted tap obtained for the pixel of interest by the predicted tap extracting unit 30 in FIG. 5 (a predicted tap made up of pixels of a student image in a similar positional relation as the pixels making up the predicted tap obtained for the pixel of interest by the predicted tap extracting unit 30 in FIG. 5), and supplying this to the supplementing unit 186.

Also, the predicted tap extracting unit 181 supplies the predicted tap having a similar tap configuration as the predicted tap obtained for the pixel of interest by the predicted tap extracting unit 30 in FIG. 5 to the level component classifying unit 184 as a level limit class tap.

The peak level direction class tap extracting unit 182 extracts a predetermined pixel from the pixels making up the student image supplied from the sub-sampling unit 180, thereby obtaining a peak level direction class tap with a tap configuration that is the same as the peak level direction class tap obtained for the pixel of interest by the peak level direction class tap extracting unit 31 in FIG. 5 (a peak level direction class tap made up of pixels of the student image in a similar positional relation as the pixels making up the peak level direction class tap obtained for the pixel of interest by the peak level direction class tap extracting unit 31 in FIG. 5) and supplying this to the level component classifying unit 184.

The waveform class tap extracting unit 183 extracts a predetermined pixel out of the pixels making up the student image supplies from the sub-sampling unit 180, thereby obtaining a waveform class tap with a tap configuration that is the same as the waveform class tap obtained for the pixel of interest by the waveform class tap extracting unit 32 in FIG. 5 (a waveform class tap made up of pixels of the student image in a similar positional relation as the pixels making up the waveform class tap obtained for the pixel of interest by the waveform class tap extracting unit 32 in FIG. 5) and supplying this to the waveform pattern classifying unit 185.

The level component classifying unit 184 performs level component classifying processing that is the same as the level component classifying unit 33 in FIG. 5, based on the level limit class tap from the predicted tap extracting unit 181 and the peak level direction class tap from the peak level direction class tap extracting unit 182, and supplies the level component class code corresponding to the level component class of the pixel of interest obtained as a result thereof to the supplementing unit 186.

The waveform pattern classifying unit 185 performs waveform pattern classifying processing that is the same as the waveform pattern classifying unit 34 in FIG. 5, based on the waveform of the waveform class tap from the waveform class tap extracting unit 183, and supplies the waveform pattern class code corresponding to the waveform pattern class of the pixel of interest obtained as a result thereof to the supplementing unit 186.

The tutor image corresponding to the student image output from the sub-sampling unit 180 is supplied to the supplementing unit 186. The supplementing unit 186 performs supplementing, regarding (the pixels values of) the pixels of interest of the tutor image supplied thereto, and the pixels of the student image making up the predicted tap for the pixel of interest from the predicted tap extracting unit 181, for every level component class code from the level component classifying unit 184 and waveform pattern class code from the waveform pattern classifying unit 185.

That is to say, the pixel value $y_k'$ of the pixel of interest of the pixels making up the tutor image, the pixel value $x_{n,k}$ of the pixels of the student image making up the predicted tap for the pixel of interest output by the predicted tap extracting unit 181, the level component class code expressing the level component class of the pixel of interest output by the level component classifying unit 184, and the waveform pattern class code expressing the waveform pattern class of the pixel of interest output by the waveform pattern classifying unit 185, are supplied to the supplementing unit 186.

For every level component class corresponding to the level component class from the level component classifying unit 184 and waveform pattern class corresponding to the waveform pattern class code from the waveform pattern classifying unit 185, the supplementing unit 186 uses the predicted tap (student image) $x_{n,k}$, and performs multiplication ($x_{n,k}$, $x_{n',k}$) between student images in a matrix on the left side of Expression (12) and computation equivalent to summation (Σ).

Further, for every level component class corresponding to the level component class from the level component classifying unit 184 and waveform pattern class corresponding to the waveform pattern class code from the waveform pattern classifying unit 185, the supplementing unit 186 uses the predicted tap (student image) $x_{n,k}$ and tutor image $y_k$ to perform multiplication ($x_{n,k}$, $y_k$) between the student image $x_{n,k}$ and tutor image $y_k$ in the vector on the right side of Expression (12) and computation equivalent to summation (Σ).

That is to say, the supplementing unit 186 has the matrix component ($\Sigma x_{n,k} x_{n',k}$) on the left side of the Expression (12) obtained for the tutor image serving as the pixel of interest earlier, and the vector component ($\Sigma x_{n,k} y_k$) on the right side, stored in an internal memory (not shown), and for the tutor image newly serving as a pixel of interest as to the matrix component ($\Sigma x_{n,k} x_{n',k}$) or vector component ($\Sigma x_{n,k} y_k$), supplements a corresponding component $x_{n,k+1} x_{n',k+1}$ or $x_{n,k+1} y_{k+1}$ that is calculated using the tutor image $y_{k+1}$ and student image $x_{n,k+1}$ (performs the addition expressed with the summation in Expression (12)).

The supplementing unit 186 performs the above-described supplementing for all of the pixels of the tutor image as pixels of interest, thereby setting up a normal equation shown in Expression (12) for each of multiple combinations of the level component class and waveform pattern class, and supplying the normal equations to the coefficient computing unit 187.

The coefficient computing unit 187 solves the normal equations for each of the multiple combinations of the level component class and waveform pattern class supplied from the supplementing unit 186, thereby finding and outputting the prediction coefficient $w_n$ for each of the multiple combinations of the level component class and waveform pattern class.

Next, learning processing performed by the learning device 151 in FIG. 21 will be described with reference to the flowchart in FIG. 22.

In step S151, the sub-sampling unit 180 subjects the supplied tutor image to sub-sampling and lowers the resolution thereof, thereby generating a student image, and supplies this to the predicted tap extracting unit 181, peak level direction class tap extracting unit 182, and waveform class tap extracting unit 183.

In step S152, the predicted tap extracting unit 181 causes the pixels making up the tutor image to become the pixel of interest, sequentially, in raster scan order, for example.

In step S153, the predicted tap extracting unit 181 extracts predetermined pixels from the pixels making up the student image from the sub-sampling unit 180, thereby obtaining a predicted tap having the same tap configuration as that of the predicted tap obtained for the pixel of interest by the predicted tap extracting unit 30 in FIG. 5 (the predicted tap made up of pixels of the student image having the same positional relation as the pixels making up the predicted tap obtained for the pixel of interest by the predicted tap extracting unit 30 in FIG. 5), and supplies this to the supplementing unit 186.

Also, in step S153, the predicted tap extracting unit 181 supplies the predicted tap having the same tap configuration as that of the predicted tap obtained for the pixel of interest by the predicted tap extracting unit 30 in FIG. 5 to the level component classifying unit 184, as a level limit class tap.

In step S154, the peak level direction class tap extracting unit 182 extracts predetermined pixels making up the student image supplied from the sub-sampling unit 180, thereby obtaining a peak level direction class tap having the same tap configuration as the peak level direction class tap obtained for the pixel of interest by the peak level direction class tap extracting unit 31 in FIG. 5 (a peak level direction class tap made up of pixels of a student image having the same positional relation as pixels making up the peak level direction class tap obtained for the pixel of interest by the peak level direction class tap extracting unit 31 in FIG. 5), and supplies this to the level component classifying unit 184.

In step S155, the waveform class tap extracting unit 183 extracts predetermined pixels making up the student image supplied from the sub-sampling unit 180, thereby obtaining a waveform class tap having the same tap configuration as the waveform class tap obtained for the pixel of interest by the waveform class tap extracting unit 32 in FIG. 5 (a waveform class tap made up of pixels of a student image having the same positional relation as the pixels making up the waveform class tap obtained for the pixel of interest by the waveform class tap extracting unit 32 in FIG. 5), and supplies this to the waveform pattern classifying unit 185.

In step S156, the level component classifying unit 184 performs level component classifying processing similar to that of the level component classifying unit 33 in FIG. 5, based on the level limit class tap from the predicted tap extracting unit 181 and the peak level direction class tap from the peak level direction class tap extracting unit 182, and supplies the level component class code corresponding to the level component class of the pixel of interest obtained as a result thereof to the supplementing unit 186.

In step S157, the waveform pattern classifying unit 185 performs waveform pattern classifying processing similar to that of the waveform pattern classifying unit 34 in FIG. 5, based on the waveform of the waveform class tap from the waveform class tap extracting unit 183, and supplies this to the supplementing unit 186.

In step S158, the supplementing unit 186 performs supplementing, regarding (the pixel values of) the pixel of interest of the tutor image supplied thereto, and the pixels of the student image making up the predicted tap for the pixel of interest from the predicted tap extracting unit 181, for each waveform pattern class code from the level component class code from the level component classifying unit 184 and the waveform pattern classifying unit 185.

The processing is advanced from step S158 to step S159, and the predicted tap extracting unit 181 determines whether or not there are any pixels not yet taken as the pixel of interest, out of the pixels making up the tutor image.

In the case determination is made in step S159 that there are pixels not yet taken as the pixel of interest, the flow is returned to step S152, the processing is advanced to step S153, with the predicted tap extracting unit 181 taking one of the pixels making up the tutor image that has not yet been a pixel of interest, as a new pixel of interest, and similar processing thereafter is repeated.

On the other hand, in the case determination is made in step S159 that there are no pixels not yet taken as the pixel of interest, i.e. in the case that with the supplementing unit 186, all of the pixels of the tutor image have been taken as the pixel of interest and subjected to the above-described supplementing, whereby a normal equation as shown in Expression (12) is obtained for each of the combinations of level component class and waveform pattern class, the processing is advanced to step S160, and the supplementing unit 186 supplies the normal equations to the coefficient computing unit 187.

Figure 22:
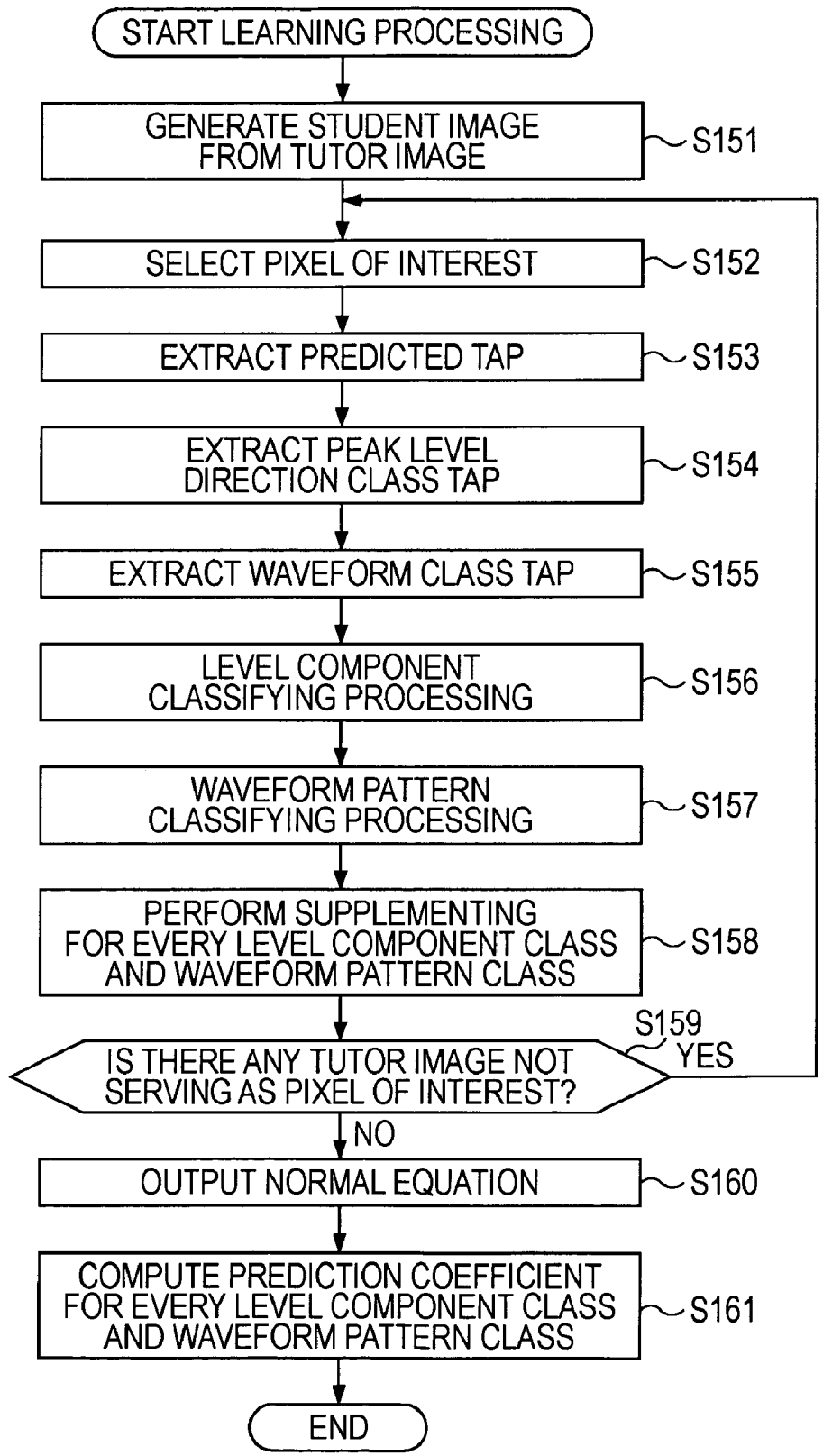
FIG. 22 is a flowchart describing learning processing.

The processing is then advanced from step S160 to step S161, and the coefficient computing unit 187 solves the normal equations for each of the combinations of level component class and waveform pattern class as supplied from the supplementing unit 186, whereby a prediction coefficient $w_n$ is obtained and output for each of the combinations of level component class and waveform pattern class, and the learning processing in FIG. 22 is ended.

Thus, with the level component classifying processing in step S156 with the learning processing in FIG. 22, the ratio between the permitted level width LW and the dynamic range DR of the level limit class tap are used for classifying the pixel of interest into one class of multiple level component classes.

Further, the narrower that the permitted level width LW is, and the greater that the dynamic range DR is, the predicted value of the pixel of interest has a tendency to rise above the upper limit level or fall below the lower limit level.

Thus, with the learning processing in FIG. 22, the pixel of interest is classified with consideration for the permitted level width LW and the dynamic range DR of the level limit class tap. Thus, compared to classification adaptive processing according to related art, a prediction coefficient that suppresses the predicted value of the pixel of interest from rising above the upper limit level or falling below the lower limit level, i.e. a prediction coefficient that can predict a high quality image can be learned (generated).

FIG. 23 shows the results of a simulation comparing the number of pixels of a tutor image, wherein the predicted value of the predicted tutor image is at or above the upper limit level or below the lower limit level, in a case of predicting the tutor image corresponding to the student image thereof, using the student image used for learning processing in FIG. 22 with the image conversion processing in FIG. 16 that performs level component classifying processing and waveform pattern classifying processing, and in a case of predicting the tutor image corresponding to the student image thereof, using the student image with image conversion processing according to related art which only performs waveform pattern classifying processing and which does not perform level component classifying processing.

Note that the student image used for the simulation is 8-bit image data, and the upper limit level is 255 and the lower limit level is 0.

As shown in FIG. 23, with image conversion processing according to related art which only performs waveform pattern classifying processing and which does not perform level component classifying processing, the number of pixels wherein the predicted value of the predicted tutor image is below the lower limit level is 231,687, and the number of pixels wherein the predicted value is at or above the upper limit level is 896,917.

Also, with the image conversion processing in FIG. 16 which performs both level component classifying processing and waveform pattern classifying processing, the number of pixels wherein the predicted value of the predicted tutor image is below the lower limit level is 160,357, and the number of pixels wherein the predicted value is at or above the upper limit level is 710,933.

From the results of the simulation shown in FIG. 23, we can see that the predicted values of the predicted tutor image with the image conversion processing in FIG. 16 is less likely to be below the lower limit level or at or above the upper limit level, as compared to image conversion processing according to related art. Accordingly, we can say that with the image conversion processing in FIG. 16, a higher-quality image can be predicted.

With the above-described embodiment, in step S33 with the level component classifying processing in FIG. 17, the level component class identifying unit 63 in FIG. 6 identifies the level component class of the pixel of interest, based on the peak level direction class code from the peak level direction classifying unit 61 and the level limit class code from the level limit classifying unit 62, and outputs the level component class code corresponding to the level component class of the identified pixel of interest, but an arrangement may be made wherein the level limit class code corresponding to the level limit class of the pixel of interest is employed without change as the level component class code corresponding to the level component class of the pixel of interest.

That is to say, for example, in step S32 with the level component classifying processing in FIG. 17, the level limit classifying unit 62 in FIG. 6 performs level limit classifying processing to classify the pixel of interest into one of multiple level limit classes, and the level limit class code corresponding to the level limit class of the pixel of interest obtained as a result thereof is output to the coefficient ROM 35 as the level component class code corresponding to the level component class of the pixel of interest.

In this case, step S33 in the level component classifying processing in FIG. 17 can be omitted, whereby the level component classifying processing can be performed more quickly as compared to the case wherein the processing in step S33 is performed.

Also, with the above-described embodiment, with the learning device 151 in FIG. 21, the prediction coefficients for each level component class and waveform pattern class are computed with the image equivalent to high resolution image data serving as a tutor image, and the image equivalent to low resolution image data obtained by subjecting the tutor image to sub-sampling serving as a student image, but an arrangement may be made wherein the same subject is photographed with cameras having different resolutions, and the prediction coefficients for each level component class and waveform pattern class are computed with the image obtained by photographing with a camera having high resolution serving as the tutor image and the image obtained by photographing with a camera having low resolution serving as the student image.

Note that an image processing device employing the present invention can be a television receiver or a hard disk recorder or the like.

Note that the image conversion processing in FIG. 16 and learning processing in FIG. 22 as described above may be executed with dedicated hardware or may be executed with software. In the case of executing the processing string with software, a program making up such software is installed in a built-in type computer, or installed from a program storage medium into a general-use personal computer which can execute various types of functions by installing various types of programs.

FIG. 24 is a block diagram showing a configuration example of a computer that executes the image conversion processing in FIG. 16 and the learning processing in FIG. 22 as described above with a program.

A CPU (Central Processing Unit) 201 executes various types of processing according to the programs stored in a ROM (Read Only Memory) 202 or storage unit 208. Programs for the CPU 201 to execute and data are stored in a RAM (Random Access Memory) 203 as appropriate. The CPU 201, ROM 202, and RAM 203 are mutually connected with a bus 204.

An input/output interface 205 is also connected to the CPU 201 via the bus 204. The input/output interface 205 is connected to an input unit 206 made up of a keyboard, mouse, microphone, and so forth, and an output unit 207 made up of a display, speak, and so forth. The CPU 201 executes various types of processing corresponding to commands input from the input unit 206. The CPU 201 outputs the results of the processing to the output unit 207.

A storage unit 208 which is connected to the input/output interface 205 is made up of a heard disk, for example, and stored programs that the CPU 201 executes, and various types of data and so forth. A communication unit 209 communicates with external devices via a network such as the Internet or a local area network.

Also, an arrangement may be made wherein a program is obtained via the communication unit 209 and stored in the storage unit 208.

A drive 210 that is connected to the input/output interface 205 has removable media 211 mounted thereto, such as a magnetic disk, optical disc, magneto-optical disk, or semiconductor memory, at which time drives such removable media to obtain the programs and data recorded therein. The obtained programs and data are transmitted to the storage unit 208 and stored as suitable.

The program storage medium to store the program which is installed in the computer and caused to be in a state executable by the computer, is configured as removable media 211 which is a packaged media made up of a magnetic disk (including flexible disk), optical disc (including CD-ROM (Compact Disc-Read Only Memory) and DVD (Digital Versatile Disc)), magneto-optical disk (including MD (Mini-Disc)), or semiconductor memory or the like, or as a hard disk made up of the ROM 202 or storage unit 208 wherein the program is temporarily or permanently stored. The storage of the program in the program storage medium can be performed using a cable or wireless communication medium such as a local area network, the Internet, or digital satellite broadcasting, via the communication unit 209 which is an interface such as a router or modem, as appropriate.

Note that with the present Specification, the steps describing the program stored in the program storage medium include processing performed in a time-series manner in the described sequence, as a matter of course, but are not restricted to processing in a time-series manner, and also include processing executed in a parallel manner or individually.

The embodiments according to the present invention are not limited to the above-described embodiment, and various types of changes may be made within the scope of the essence of the present invention. It should be understood by those skilled in the art that various modifications, combinations, sub-combinations and alterations may occur depending on design requirements and other factors insofar as they are within the scope of the appended claims or the equivalents thereof.

What is claimed is:

1. An image processing device to convert a first image data into a second image data having a higher image quality, said image processing device comprising:

predicted tap extracting means to extract from said first image data a plurality of pixels existing in the periphery of a corresponding pixel, including the corresponding pixel of said first image data that corresponds to a pixel of interest, as a predicted tap to be used for prediction computing to predict such pixel of interest which is a pixel of said second image data on which to focus interest;

level limit class tap extracting means to extract from said first image data a plurality of pixels existing in the periphery of said corresponding pixel, including said corresponding pixel, as a level limit class tap to be used for level limit classifying processing that classifies said pixel of interest into one of a plurality of level limit classes;

waveform class tap extracting means to extract from said first image data a plurality of pixels existing in the periphery of said corresponding pixel, including said corresponding pixel, as a waveform class tap to be used for waveform pattern classifying processing that classifies said pixel of interest into one of a plurality of waveform pattern classes;

level limit classifying means to perform said level limit classifying processing to classify said pixel of interest into one of a plurality of level limit classes, based on a ratio between a level width which expresses the size of a range wherein said pixel of interest can be taken and a dynamic range of the plurality of pixels making up said level limit class tap, which is obtained according to a maximum value or minimum value of the pixel values of the plurality of pixels making up said level limit class tap;

waveform pattern classifying means to perform said waveform pattern classifying processing to classify said pixel of interest into one of a plurality of waveform pattern classes, based on a waveform expressing change to the plurality of pixels making up said waveform class tap;

prediction coefficient output means to output a prediction coefficient corresponding to a combination of a level limit class of said pixel of interest and a waveform pattern class of said pixel of interest, from among prediction coefficients corresponding respectively to a plurality of combinations of said level limit class and said waveform pattern class which are obtained and held beforehand by learning which minimizes the error difference between the result of said prediction computing using said first image data for learning and said second image data for learning which corresponds to said first image data for learning; and prediction computing means to predict said pixel of interest of said second image data by said prediction computing using said prediction coefficient output by said prediction coefficient output means and the plurality of pixels making up said prediction tap extracted by said prediction tap extracting means.

2. The image processing device according to claim 1, further comprising:

peak level direction class tap extracting means to extract from said first image data a plurality of pixels existing in the periphery of said corresponding pixel, including said corresponding pixel, as a peak level direction class tap for use with peak level direction classifying processing to classify said pixel of interest into one of a plurality of peak level direction classes; and peak level direction classifying means to perform said peak level direction classifying processing to classify said pixel of interest into one of a plurality of peak level direction classes, based on a histogram of said peak level direction class tap; wherein said level limit classifying means has level width computing means to compute one of a range from the maximum value of the pixel values of the plurality of pixels making up said level limit class tap up to an upper limit level of the pixel values that said pixel of interest can take, or a range from a lower level of the pixels values that said pixel of interest can take up to a minimum value of the pixel values of the plurality of pixels making up said level limit class tap, as said level width;

dynamic range computing means to compute a dynamic range of the plurality of pixels making up said level limit class tap; and level limit class identifying means to identify the level limit class of said pixel of interest, based on the ratio of said dynamic range computed by said level width computed with said level width computing means and said dynamic range computing means.

3. The image processing device according to claim 2, wherein the prediction coefficients obtained and held beforehand by said learning each correspond to a plurality of combinations between said level limit class and said waveform pattern class, as well as said peak level direction class;

and wherein said prediction coefficient output means outputs a prediction coefficient corresponding to a combination of the level limit class of said pixel of interest and waveform pattern class of said pixel of interest, as well as the peak level direction class of said pixel of interest, from the prediction coefficients obtained and held beforehand by said learning.

4. An image processing method for an image processing device to convert a first image data into a second image data having a higher image quality, said method comprising the steps of:

predicted tap extracting to extract from said first image data a plurality of pixels existing in the periphery of a corresponding pixel, including the corresponding pixel of said first image data that corresponds to a pixel of interest, as a predicted tap to be used for prediction computing to predict such pixel of interest which is a pixel of said second image data on which to focus interest;

level limit class tap extracting to extract from said first image data a plurality of pixels existing in the periphery of said corresponding pixel, including said corresponding pixel, as a level limit class tap to be used for level limit classifying processing that classifies said pixel of interest into one of a plurality of level limit classes;

waveform class tap extracting to extract from said first image data a plurality of pixels existing in the periphery of said corresponding pixel, including said corresponding pixel, as a waveform class tap to be used for waveform pattern classifying processing that classifies said pixel of interest into one of a plurality of waveform pattern classes;

level limit classifying to perform said level limit classifying processing to classify said pixel of interest into one of a plurality of level limit classes, based on a ratio between a level width which expresses the size of a range wherein said pixel of interest can be taken and a dynamic range of the plurality of pixels making up said level limit class tap, which is obtained according to a maximum value or minimum value of the pixel values of the plurality of pixels making up said level limit class tap;

waveform pattern classifying to perform said waveform pattern classifying processing to classify said pixel of interest into one of a plurality of waveform pattern classes, based on a waveform expressing change to the plurality of pixels making up said waveform class tap;

prediction coefficient outputting to output a prediction coefficient corresponding to a combination of a level limit class of said pixel of interest and a waveform pattern class of said pixel of interest, from among prediction coefficients corresponding respectively to a plurality of combinations of said level limit class and said waveform pattern class which are obtained and held beforehand by learning which minimizes the error difference between the result of said prediction computing using said first image data for learning and said second image data for learning which corresponds to said first image data for learning; and prediction computing to predict said pixel of interest of said second image data by said prediction computing using said prediction coefficient output in said prediction coefficient output step and the plurality of pixels making up said prediction tap extracted in said prediction tap extracting step.

5. A non-transitory computer readable medium having stored thereon a program to cause a computer to function as an image processing device to convert a first image data into a second image data having a higher image quality, said image processing device comprising:

predicted tap extracting means to extract from said first image data a plurality of pixels existing in the periphery of a corresponding pixel, including the corresponding pixel of said first image data that corresponds to a pixel of interest, as a predicted tap to be used for prediction computing to predict such pixel of interest which is a pixel of said second image data on which to focus interest;

level limit class tap extracting means to extract from said first image data a plurality of pixels existing in the periphery of said corresponding pixel, including said corresponding pixel, as a level limit class tap to be used for level limit classifying processing that classifies said pixel of interest into one of a plurality of level limit classes;

waveform class tap extracting means to extract from said first image data a plurality of pixels existing in the periphery of said corresponding pixel, including said corresponding pixel, as a waveform class tap to be used for waveform pattern classifying processing that classifies said pixel of interest into one of a plurality of waveform pattern classes;

level limit classifying means to perform said level limit classifying processing to classify said pixel of interest into one of a plurality of level limit classes, based on a ratio between a level width which expresses the size of a range wherein said pixel of interest can be taken and a dynamic range of the plurality of pixels making up said level limit class tap, which is obtained according to a maximum value or minimum value of the pixel values of the plurality of pixels making up said level limit class tap;

waveform pattern classifying means to perform said waveform pattern classifying processing to classify said pixel of interest into one of a plurality of waveform pattern classes, based on a waveform expressing change to the plurality of pixels making up said waveform class tap;

prediction coefficient output means to output a prediction coefficient corresponding to a combination of a level limit class of said pixel of interest and a waveform pattern class of said pixel of interest, from among prediction coefficients corresponding respectively to a plurality of combinations of said level limit class and said waveform pattern class which are obtained and held beforehand by learning which minimizes the error difference between the result of said prediction computing using said first image data for learning and said second image data for learning which corresponds to said first image data for learning; and prediction computing means to predict said pixel of interest of said second image data by said prediction computing using said prediction coefficient output by said prediction coefficient output means and the plurality of pixels making up said prediction tap extracted by said prediction tap extracting means.

6. A learning device to obtain a prediction coefficient to be used for prediction computing with image processing to convert a first image data into a second image data having a higher image quality, by learning that minimizes error difference between results of said prediction computing using said first image data for learning and said second image data for learning that corresponds to said first image data for learning, said learning device comprising:

predicted tap extracting means to extract from said first image data for learning a plurality of pixels existing in the periphery of a corresponding pixel, including the corresponding pixel of said first image data for learning that corresponds to a pixel of interest, as a predicted tap to be used for prediction computing to predict such pixel of interest which is a pixel on which to focus of said second image data for learning;

level limit class tap extracting means to extract from said first image data for learning a plurality of pixels existing in the periphery of said corresponding pixel, including said corresponding pixel, as a level limit class tap to be used for level limit classifying processing that classifies said pixel of interest into one of a plurality of level limit classes;

waveform class tap extracting means to extract from said first image data for learning a plurality of pixels existing in the periphery of said corresponding pixel, including said corresponding pixel, as a waveform class tap to be used for waveform pattern classifying processing that classifies said pixel of interest into one of a plurality of waveform pattern classes;

level limit classifying means to perform said level limit classifying processing to classify said pixel of interest into one of a plurality of level limit classes, based on a ratio between a level width which expresses the size of a range wherein said pixel of interest can be taken and a dynamic range of said level limit class tap, which is obtained according to a maximum value or minimum value of the pixel values of the plurality of pixels making up said level limit class tap;

waveform pattern classifying means to perform said waveform pattern classifying processing to classify said pixel of interest into one of a plurality of waveform pattern classes, based on a waveform expressing change to the plurality of pixels making up said waveform class tap; and prediction coefficient computing means to obtain a prediction coefficient which minimizes the error difference between the results of said prediction computing using said prediction tap and said pixel of interest, for each combination of said level limit class of said pixel of interest and the waveform pattern class of said pixel of interest.

7. The learning device according to claim 6, further comprising:

peak level direction class tap extracting means to extract from said first image data for learning a plurality of pixels existing in the periphery of said corresponding pixel, including said corresponding pixel, as a peak level direction class tap for use with peak level direction classifying processing to classify said pixel of interest into one of a plurality of peak level direction classes; and peak level direction classifying means to perform said peak level direction classifying processing to classify said pixel of interest into one of a plurality of peak level direction classes, based on a histogram of said peak level direction class tap; wherein said level limit classifying means has level width computing means to compute one of a range from the maximum value of the pixel values of the plurality of pixels making up said level limit class tap up to an upper limit level of the pixel values that said pixel of interest can take, or a range from a lower level of the pixels values that said pixel of interest can take up to a minimum value of the pixel values of the plurality of pixels making up said level limit class tap, as said level width;

dynamic range computing means to compute a dynamic range of the plurality of pixels making up said level limit class tap; and level limit class identifying means to identify the level limit class of said pixel of interest, based on the ratio of said dynamic range computed by said level width computed with said level width computing means and said dynamic range computing means.

8. The learning device according to claim 7, wherein said prediction coefficient computing means obtain said prediction coefficient that minimizes the error difference between the results of said prediction computing using said prediction tap and said pixel of interest, for each combination of level limit class of said pixel of interest and waveform pattern class of said pixel of interest, as well as said peak level direction class of said pixel of interest.

9. A learning method of a learning device to obtain a prediction coefficient to be used for prediction computing with image processing to convert a first image data into a second image data having a higher image quality, by learning that minimizes error difference between results of said prediction computing using said first image data for learning and said second image data for learning that corresponds to said first image data for learning, said method including the steps of:
   predicted tap extracting to extract from said first image data for learning a plurality of pixels existing in the periphery of a corresponding pixel, including the corresponding pixel of said first image data for learning that corresponds to a pixel of interest, as a predicted tap to be used for prediction computing to predict such pixel of interest which is a pixel on which to focus of said second image data for learning;
   level limit class tap extracting to extract from said first image data for learning a plurality of pixels existing in the periphery of said corresponding pixel, including said corresponding pixel, as a level limit class tap to be used for level limit classifying processing that classifies said pixel of interest into one of a plurality of level limit classes;
   waveform class tap extracting to extract from said first image data for learning a plurality of pixels existing in the periphery of said corresponding pixel, including said corresponding pixel, as a waveform class tap to be used for waveform pattern classifying processing that classifies said pixel of interest into one of a plurality of waveform pattern classes;
   level limit classifying to perform said level limit classifying processing to classify said pixel of interest into one of a plurality of level limit classes, based on a ratio between a level width which expresses the size of a range wherein said pixel of interest can be taken and a dynamic range of said level limit class tap, which is obtained according to a maximum value or minimum value of the pixel values of the plurality of pixels making up said level limit class tap;
   waveform pattern classifying to perform said waveform pattern classifying processing to classify said pixel of interest into one of a plurality of waveform pattern classes, based on a waveform expressing change to the plurality of pixels making up said waveform class tap; and
   prediction coefficient computing to obtain a prediction coefficient which minimizes the error difference between the results of said prediction computing using said prediction tap and said pixel of interest, for each combination of said level limit class of said pixel of interest and the waveform pattern class of said pixel of interest.

10. A non-transitory computer readable medium having stored thereon a program to cause a computer to function as a learning device to obtain a prediction coefficient to be used for prediction computing with image processing to convert a first image data into a second image data having a higher image quality, by learning that minimizes error difference between results of said prediction computing using said first image data for learning and said second image data for learning that corresponds to said first image data for learning, said learning device comprising:
   predicted tap extracting means to extract from said first image data for learning a plurality of pixels existing in the periphery of a corresponding pixel, including the corresponding pixel of said first image data for learning that corresponds to a pixel of interest, as a predicted tap to be used for prediction computing to predict such pixel of interest which is a pixel on which to focus of said second image data for learning;
   level limit class tap extracting means to extract from said first image data for learning a plurality of pixels existing in the periphery of said corresponding pixel, including said corresponding pixel, as a level limit class tap to be used for level limit classifying processing that classifies said pixel of interest into one of a plurality of level limit classes;
   waveform class tap extracting means to extract from said first image data for learning a plurality of pixels existing in the periphery of said corresponding pixel, including said corresponding pixel, as a waveform class tap to be used for waveform pattern classifying processing that classifies said pixel of interest into one of a plurality of waveform pattern classes;
   level limit classifying means to perform said level limit classifying processing to classify said pixel of interest into one of a plurality of level limit classes, based on a ratio between a level width which expresses the size of a range wherein said pixel of interest can be taken and a dynamic range of said level limit class tap, which is obtained according to a maximum value or minimum value of the pixel values of the plurality of pixels making up said level limit class tap;
   waveform pattern classifying means to perform said waveform pattern classifying processing to classify said pixel of interest into one of a plurality of waveform pattern classes, based on a waveform expressing change to the plurality of pixels making up said waveform class tap; and
   prediction coefficient computing means to obtain a prediction coefficient which minimizes the error difference between the results of said prediction computing using said prediction tap and said pixel of interest, for each combination of said level limit class of said pixel of interest and the waveform pattern class of said pixel of interest.

11. An image processing device to convert a first image data into a second image data having a higher image quality, said image processing device comprising:
   a predicted tap extracting unit to extract from said first image data a plurality of pixels existing in the periphery of a corresponding pixel, including the corresponding pixel of said first image data that corresponds to a pixel of interest, as a predicted tap to be used for prediction computing to predict such pixel of interest which is a pixel of said second image data on which to focus interest;
   a level limit class tap extracting unit to extract from said first image data a plurality of pixels existing in the periphery of said corresponding pixel, including said corresponding pixel, as a level limit class tap to be used for level limit classifying processing that classifies said pixel of interest into one of a plurality of level limit classes;

a waveform class tap extracting unit to extract from said first image data a plurality of pixels existing in the periphery of said corresponding pixel, including said corresponding pixel, as a waveform class tap to be used for waveform pattern classifying processing that classifies said pixel of interest into one of a plurality of waveform pattern classes;

a level limit classifying unit to perform said level limit classifying processing to classify said pixel of interest into one of a plurality of level limit classes, based on a ratio between a level width which expresses the size of a range wherein said pixel of interest can be taken and a dynamic range of the plurality of pixels making up said level limit class tap, which is obtained according to a maximum value or minimum value of the pixel values of the plurality of pixels making up said level limit class tap;

a waveform pattern classifying unit to perform said waveform pattern classifying processing to classify said pixel of interest into one of a plurality of waveform pattern classes, based on a waveform expressing change to the plurality of pixels making up said waveform class tap;

a prediction coefficient output unit to output a prediction coefficient corresponding to a combination of a level limit class of said pixel of interest and a waveform pattern class of said pixel of interest, from among prediction coefficients corresponding respectively to a plurality of combinations of said level limit class and said waveform pattern class which are obtained and held beforehand by learning which minimizes the error difference between the result of said prediction computing using said first image data for learning and said second image data for learning which corresponds to said first image data for learning; and a prediction computing unit to predict said pixel of interest of said second image data by said prediction computing using said prediction coefficient output by said prediction coefficient output unit and the plurality of pixels making up said prediction tap extracted by said prediction tap extracting unit.

12. A non-transitory computer readable medium having stored thereon a program to cause a computer to function as an image processing device to convert a first image data into a second image data having a higher image quality, said image processing device comprising:

a predicted tap extracting unit to extract from said first image data a plurality of pixels existing in the periphery of a corresponding pixel, including the corresponding pixel of said first image data that corresponds to a pixel of interest, as a predicted tap to be used for prediction computing to predict such pixel of interest which is a pixel of said second image data on which to focus interest;

a level limit class tap extracting unit to extract from said first image data a plurality of pixels existing in the periphery of said corresponding pixel, including said corresponding pixel, as a level limit class tap to be used for level limit classifying processing that classifies said pixel of interest into one of a plurality of level limit classes;

a waveform class tap extracting unit to extract from said first image data a plurality of pixels existing in the periphery of said corresponding pixel, including said corresponding pixel, as a waveform class tap to be used for waveform pattern classifying processing that classifies said pixel of interest into one of a plurality of waveform pattern classes;

a level limit classifying unit to perform said level limit classifying processing to classify said pixel of interest into one of a plurality of level limit classes, based on a ratio between a level width which expresses the size of a range wherein said pixel of interest can be taken and a dynamic range of the plurality of pixels making up said level limit class tap, which is obtained according to a maximum value or minimum value of the pixel values of the plurality of pixels making up said level limit class tap;

a waveform pattern classifying unit to perform said waveform pattern classifying processing to classify said pixel of interest into one of a plurality of waveform pattern classes, based on a waveform expressing change to the plurality of pixels making up said waveform class tap;

a prediction coefficient output unit to output a prediction coefficient corresponding to a combination of a level limit class of said pixel of interest and a waveform pattern class of said pixel of interest, from among prediction coefficients corresponding respectively to a plurality of combinations of said level limit class and said waveform pattern class which are obtained and held beforehand by learning which minimizes the error difference between the result of said prediction computing using said first image data for learning and said second image data for learning which corresponds to said first image data for learning; and a prediction computing unit to predict said pixel of interest of said second image data by said prediction computing using said prediction coefficient output by said prediction coefficient output unit and the plurality of pixels making up said prediction tap extracted by said prediction tap extracting unit.

13. A learning device to obtain a prediction coefficient to be used for prediction computing with image processing to convert a first image data into a second image data having a higher image quality, by learning that minimizes error difference between results of said prediction computing using said first image data for learning and said second image data for learning that corresponds to said first image data for learning, said learning device comprising:

a predicted tap extracting unit to extract from said first image data for learning a plurality of pixels existing in the periphery of a corresponding pixel, including the corresponding pixel of said first image data for learning that corresponds to a pixel of interest, as a predicted tap to be used for prediction computing to predict such pixel of interest which is a pixel on which to focus of said second image data for learning;

a level limit class tap extracting unit to extract from said first image data for learning a plurality of pixels existing in the periphery of said corresponding pixel, including said corresponding pixel, as a level limit class tap to be used for level limit classifying processing that classifies said pixel of interest into one of a plurality of level limit classes;

a waveform class tap extracting unit to extract from said first image data for learning a plurality of pixels existing in the periphery of said corresponding pixel, including said corresponding pixel, as a waveform class tap to be used for waveform pattern classifying processing that classifies said pixel of interest into one of a plurality of waveform pattern classes;

a level limit classifying unit to perform said level limit classifying processing to classify said pixel of interest into one of a plurality of level limit classes, based on a ratio between a level width which expresses the size of a range wherein said pixel of interest can be taken and a dynamic range of said level limit class tap, which is obtained according to a maximum value or minimum value of the pixel values of the plurality of pixels making up said level limit class tap;

a waveform pattern classifying unit to perform said waveform pattern classifying processing to classify said pixel of interest into one of a plurality of waveform pattern classes, based on a waveform expressing change to the plurality of pixels making up said waveform class tap; and a prediction coefficient computing unit to obtain a prediction coefficient which minimizes the error difference between the results of said prediction computing using said prediction tap and said pixel of interest, for each combination of said level limit class of said pixel of interest and the waveform pattern class of said pixel of interest.

* * * * *